US012769160B2

(12) United States Patent
Chen

(10) Patent No.: US 12,769,160 B2
(45) Date of Patent: Oct. 20, 2026

(54) DUAL-STAGE OPTICAL ISOLATOR CORE AND OPTICAL ISOLATOR

(71) Applicant: SHENZHEN INNOWAVE TECHNOLOGY CO., LTD., Shenzhen (CN)

(72) Inventor: Guoqiang Chen, Shenzhen (CN)

(73) Assignee: SHENZHEN INNOWAVE TECHNOLOGY CO., LTD., Shenzhen (CN)

( * ) Notice: Subject to any disclaimer, the term of this patent is extended or adjusted under 35 U.S.C. 154(b) by 276 days.

(21) Appl. No.: 18/814,603

(22) Filed: Aug. 26, 2024

(65) Prior Publication Data

US 2025/0076692 A1 Mar. 6, 2025

(30) Foreign Application Priority Data

Sep. 4, 2023 (CN) ........................ 202322399487.2

(51) Int. Cl.
*G02F 1/095* (2006.01)
*G02B 5/30* (2006.01)

(52) U.S. Cl.
CPC ......... *G02F 1/0955* (2013.01); *G02B 5/3083* (2013.01)

(58) Field of Classification Search
None
See application file for complete search history.

(56) References Cited

U.S. PATENT DOCUMENTS

2003/0030905 A1* 2/2003 Abe ....................... G02B 27/28 359/489.05
2003/0053209 A1* 3/2003 Chang ..................... G02F 1/093 359/489.05

* cited by examiner

*Primary Examiner* — Richard H Kim

(57) ABSTRACT

The embodiments of the present disclosure discloses an optical isolator core and an optical isolator. The optical isolator core comprises: a first birefringent crystal, a first Faraday rotator, a second birefringent crystal, a second Faraday rotator, and a third birefringent crystal that are successively arrange in the forward light path, all of which are parallel plate structures. The embodiments of the present disclosure achieves backward isolation for polarization-independent and non-collimating beam which simplifies the device structure and assembly process, thereby reduce size and cost.

20 Claims, 18 Drawing Sheets

DUAL-STAGE OPTICAL ISOLATOR CORE AND OPTICAL ISOLATOR

CROSS-REFERENCE TO RELATED APPLICATIONS

This application is based upon and claims priority to Chinese Patent Application No. 202322399487.2, filed with the Chinese Patent Office on Sep. 4, 2023, titled "DUAL-STAGE OPTICAL ISOLATOR CORE AND OPTICAL ISOLATOR", the entire contents of which are incorporated herein by reference.

TECHNICAL FIELD

Embodiments of the present disclosure relate to the technical field of optics, and, relate to an optical isolator core and an optical isolator.

BACKGROUND

In optical products, to prevent backward light from entering the incident end and interfering with the incident optical systems, it is necessary to design an optical isolator in the optical path to prevent backward light from coupling into the incident optical system, thereby ensuring the stable operation of the optical product.

Existing optical isolators are mainly divided into single-stage isolator and dual-stage isolator, among which, dual-stage isolator has better isolation to the backward light than single-stage isolator. At present, dual-stage isolation is generally achieved by two sets of single-stage isolator cores of collimating-beam design placed in series. Each set of isolator cores includes two birefringent-crystal wedges and a Faraday rotator set between the two birefringent-crystal wedges. The main principle is to utilize the Faraday rotator to rotate the polarization state of the forward light and backward light in the same direction, and the different refractive indexes and refraction angles of the o-light and e-light of the birefringent-crystals wedges to achieve normal output of the forward light and dual-stage isolation of the backward light.

In practice, the inventors of the embodiments of the present disclosure have found that: the existing dual-stage isolator has a complex structure, high manufacturing cost, large spatial size, and is mainly processed for collimating light, its application is limited and its coupling process is complex.

SUMMARY

According to one aspect of the embodiments of the present disclosure, an optical isolator core is provided. The optical isolator core includes: a first birefringent crystal, a first Faraday rotator, a second birefringent crystal, a second Faraday rotator, and a third birefringent crystal that are successively arranged in the forward optical path and all of them are parallel plate structures. When forward light is incident on the first birefringent crystal along the forward optical path, the first birefringent crystal is used to separate the forward light into first crystal forward o-light and first crystal forward e-light whose polarization directions are perpendicular to each other, and output them to the first Faraday rotator. Inside the first birefringent crystal, the first crystal forward o-light generates a first displacement of the first crystal forward o-light, and the first crystal forward e-light generates a first displacement of the first crystal forward e-light. The first Faraday rotator is used to rotate the polarization direction of the first crystal forward o-light and the first crystal forward e-light by an angle of α1 in the first rotation direction and then output them to the second birefringent crystal, where α1 equals 45°. The second birefringent crystal is used to generates a second displacement of the first crystal forward o-light, and a second displacement of the first crystal forward e-light, and then output them to the second Faraday rotator. The second Faraday rotator is used to rotate the polarization direction of the first crystal forward o-light and the first crystal forward e-light by an angle of α2 in the second rotation direction and then output them to the third birefringent crystal, where α2 equals 45°. The third birefringent crystal is used to generates a third displacement of the first crystal forward o-light, and a third displacement of the first crystal forward e-light. The sum of the first displacements of the first crystal forward o-light, second displacements of the first crystal forward o-light, and third displacements of the first crystal forward o-light is equal to the sum of the first displacements of the first crystal forward e-light, second displacements of the first crystal forward e-light, and third displacements of the first crystal forward e-light, and the first crystal forward o light and the first crystal forward e light are coincident with each other in response to exiting from the third birefringent crystal. In the case that backward light entering backward along the forward optical path is incident on the third birefringent crystal, the third birefringent crystal is used to separate the backward light into the third crystal backward o-light and the third crystal backward e-light whose polarization directions are perpendicular to each other, and output them to the second Faraday rotator. Inside the third birefringent crystal, the third crystal backward o-light generates a third displacement of the third crystal backward o-light, and the third crystal backward e-light generates a third displacement of the third crystal backward e-light. The second Faraday rotator is used to rotate the polarization direction of the third crystal backward o-light and the third crystal backward e-light by an angle of α2 in the second rotation direction and then output them to the second birefringent crystal. The second birefringent crystal is used to cause the third crystal backward o-light to generate a second displacement of the third crystal backward o-light and the third crystal backward e-light to generate a second displacement of the third crystal backward e-light, and then output them to the first Faraday rotator. The first Faraday rotator is used to rotate the polarization direction of the third crystal backward o-light and the third crystal backward e-light by an angle of α1 in the first rotation direction and then output them to the first birefringent crystal. The first birefringent crystal is used to cause the third crystal backward o-light to generate a first displacement of the third crystal backward o-light and the third crystal backward e-light to generate a first displacement of the third crystal backward e-light. The sum of the third displacement of the third crystal backward o-light, the second displacement of the third crystal backward o-light, and the first displacements of the third crystal backward o-light causes the third crystal backward o-light to deviate from the forward optical path, and the sum of the third displacement of the third crystal backward e-light, the second displacement of the third crystal backward e-light, and the first displacements of the third crystal backward e-light causes the third crystal backward e-light to deviate from the forward optical path.

According to another aspect of the embodiments of the present disclosure, an optical isolator is provided, which includes an input waveguide, a lens, an optical isolator core as described in any of the above aspects, and an output waveguide, that are successively arranged along a forward optical path. The input waveguide is used to import divergent light along the forward direction of the optical path and output it to the lens. The lens is used to convert the divergent beam into convergent beam and output it to the first birefringent crystal of the optical isolator core. The third birefringent crystal of the optical isolator core is used to output the recombined beam of the first crystal forward o-light and the first crystal forward e-light to the output waveguide, the output waveguide is used to export the recombined beam.

According to another aspect of the embodiments of the present disclosure, an optical isolator is provided, which includes an input waveguide, an optical isolator core as described in any of the above aspects, a lens, and an output waveguide, that are successively arranged along a forward optical path. The input waveguide is used to import divergent light along the forward direction of the optical path and output it to the first birefringent crystal of the isolator core. The third birefringent crystal of the isolator core is used to output the recombined beam of the first crystal forward o-light and the first crystal forward e-light to the lens. The lens is used to convert the recombined divergent beam into convergent beam and output it to the output waveguide, the output waveguide is used to export the convergent beam.

BRIEF DESCRIPTION OF THE DRAWINGS

Upon reading the detailed description of the preferred embodiment provided below, various advantages and benefits will become clear to those skilled in the art. The accompanying drawings are merely for illustrating some exemplary embodiments, but shall not be construed as limiting the present disclosure. In the drawings.

DETAILED DESCRIPTION

Figure 1:
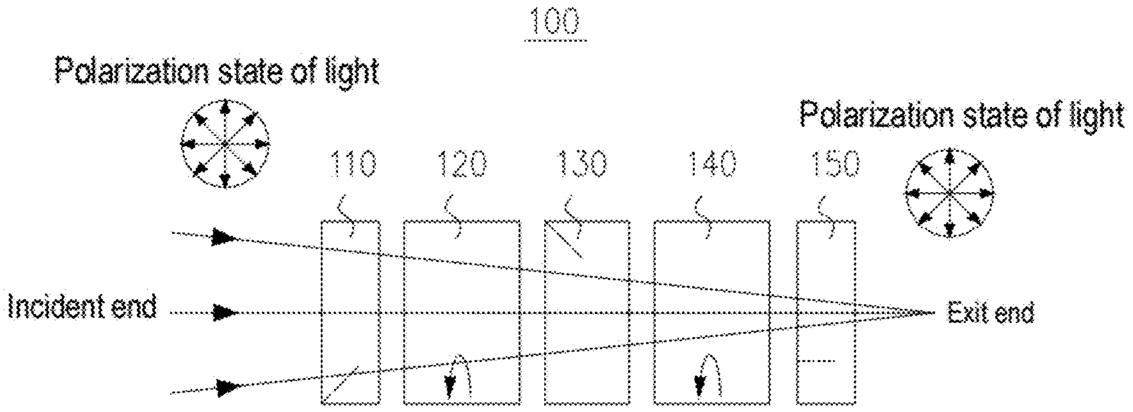
FIG. 1 is a schematic structural and optical path diagram of an optical isolator core according to an embodiment of the present disclosure.

The embodiments of the technical solution of the present disclosure are hereinafter described in detail with reference to the accompanying drawings. The following embodiments are only for more clearly illustrating the technical solution of the present disclosure and the present disclosure shall not be limited by the embodiments illustrated herein.

Unless otherwise defined, all technical and scientific terms used below have the same meaning as generally understood by those skilled in the technical field to which the embodiments of the present disclosure pertains; the terms used in present disclosure are only for the purpose of describing the specific embodiments and are not intended to limit the embodiments of the present disclosure; the terms “comprise” and “have” and their variants in the specification and claims of the embodiments of the present disclosure, as well as in the drawing description above, are intended to cover non-exclusive inclusions.

In the description of the exemplary embodiments of the present disclosure, technical terms such as “first,” “second,” and so on are only used to distinguish different objects and should not be understood to indicate or imply relative importance or to suggest a specific number, specific order, or primary and secondary relationships of the technical features indicated. In the description of the exemplary embodiments of the present disclosure, “multiple” means more than two, unless otherwise specifically limited.

The term “example” mentioned in this text means that specific features, structures, or characteristics described in conjunction with the example can be included in at least one example of the embodiments of the present disclosure. The appearance of this phrase at various places in the specification does not necessarily refer to the same example, nor does it refer to an independent or alternative example that is exclusive of other examples. Those skilled in the art will explicitly and implicitly understand that the examples described in this text can be combined with other examples.

In the description of the exemplary embodiments of the present disclosure, the term “and/or” is merely a way to describe the relationship between associated objects, indicating that there can be three relationships, for example, A and/or B, which can indicate: the presence of A, the presence of both A and B, or the presence of B alone. In addition, the character “/” in this text generally indicates that the associated objects before and after are in an “or” relationship.

In the description of the exemplary embodiments of the present disclosure, the term “multiple” refers to more than two (including two), similarly, “multiple sets” refers to more than two sets (including two sets), and “multiple pieces” refers to more than two pieces (including two pieces).

In the description of the exemplary embodiments of the present disclosure, the technical terms “center,” “longitudinal,” “lateral,” “length,” “width,” “thickness,” “top,” “bottom,” “front,” “back,” “left,” “right,” “vertical,” “horizontal,” “top,” “bottom,” “inside,” “outside,” “clockwise,” “counterclockwise,” “axial,” “radial,” and “circumferential” and other directional or positional relationships are based on the directions or positional relationships shown in the drawings, only for the convenience of describing the exemplary embodiments of the present disclosure and to simplify the description, and do not indicate or imply that the device or component referred to must have a specific direction, be constructed and operated in a specific direction, so they should not be understood as a limitation of the exemplary embodiments of the present disclosure.

In the existing dual-stage isolators for collimating beam, for each set of isolator cores, the forward light propagated in the first wedge-shaped birefringent crystal as an o-light polarization state (refracting at an angle $\gamma$) will propagate in the second wedge-shaped birefringent crystal as the same o-light polarization state (refracting at an angle $-\gamma$) after being rotated by 45° by the Faraday rotator; similarly, the forward light propagated in the first wedge-shaped birefringent crystal as an e-light polarization state (refracting at an angle $\delta$) will propagate in the second wedge-shaped birefringent crystal as the same e-light polarization state (refracting at an angle $-\delta$) after being rotated by 45° by the Faraday rotator. Therefore, in each set of isolator cores, the two beams of linearly polarized light of the forward direction will form collimating beam in the same direction when they finally exit the isolator core, and can be coupled and output. Here, $\gamma$ is not equal to $\delta$.

In each set of isolator cores, taking the wedge-shaped birefringent crystal that the backward light passes firstly as the first wedge-shaped birefringent crystal. Since the Faraday rotator rotates the polarization state of the forward light and backward light in the same direction, the backward linearly polarized light propagating in the first wedge-shaped birefringent crystal as o-light (refracting at an angle $\gamma$) will be rotated by 45° by the Faraday rotator, the polarization state forms a 90° rotation relative to the corresponding forward linearly polarized light, the o-light and e-light are exchanged in the second wedge-shaped birefringent crystal, and thus the backward o-light in the first wedge-shaped birefringent crystal propagates as e-light in the second wedge-shaped birefringent crystal (refracting at an angle $-\delta$), and the final refracting angle is $\gamma+(-\delta)=\gamma-\delta$ when the backward light finally exits from the second wedge-shaped birefringent crystal; similarly, the backward e-light in the first wedge-shaped birefringent crystal (refracting at an angle $\delta$) propagates as o-light in the second wedge-shaped birefringent crystal (refracting at an angle $-\gamma$), and the final refracting angle is $\delta+(-\gamma)=\delta-\gamma$ when the backward light finally exits from the second wedge-shaped birefringent crystal. $\gamma-\delta$ is not equal to $\delta-\gamma$ and is not equal to 0, thus the two backward linearly polarized light deviate from the forward light and realize the isolation of the backward light. In-series two sets of isolator cores achieve one stage of isolation of the backward light respectively, thus forming a dual-stage isolation.

For the above dual-stage optical isolator, the structure and manufacturing of the wedge-shaped birefringent crystals are more complex and the number of optical components is larger, resulting in a higher device cost. And it is mainly used for the backward isolation of collimating beam with a limited scope of application.

In response to this, the embodiments of the present disclosure proposes an optical isolator core. Refer to FIG. 1 for details, it shows the structure of the optical isolator core and the forward optical path. As shown in the figure, the optical isolator core 100 includes a first birefringent crystal 110, a first Faraday rotator 120, a second birefringent crystal 130, a second Faraday rotator 140, and a third birefringent crystal 150, all of which are successively arranged along a transmission direction of forward light and each has a parallel plate structure.

It should be noted first that any polarization-state beam incident on a birefringent crystal will be separated into o-light and e-light, and there will be a relative displacement between the o-light and e-light. In FIG. 1, only a simple schematic description of the forward optical path is given, and the displacement of the forward light in each birefringent crystal is not shown. The displacement situation is mainly based on the following textual content, and the same applies to the backward light.

Based on this, for the backward light, when it is incident on the first birefringent crystal 110 along the forward direction of the optical path, the first birefringent crystal 110 is used to separate the forward light into the first crystal forward o-light and the first crystal forward e-light whose polarization directions are perpendicular to each other, and outputs them to the first Faraday rotator 120. Inside the first birefringent crystal 110, the first crystal forward o-light generates a first displacement of the first crystal forward o-light, and the first crystal forward e-light generates a first displacement of the first crystal forward e-light. The first Faraday rotator 120 is used to rotate the polarization direction (i.e., the polarization state) of the first crystal forward o-light and the first crystal forward e-light by $\alpha 1$ (45°) in the first rotation direction which can be clockwise or counterclockwise, and then outputs them to the second birefringent crystal 130. The second birefringent crystal 130 is used to cause the first crystal forward o-light to generate a second displacement of the first crystal forward o-light, and the first crystal forward e-light to generate a second displacement of the first crystal forward e-light, and then outputs them to the second Faraday rotator 140. The second Faraday rotator 140 is used to rotate the polarization direction of the first crystal forward o-light and the first crystal forward e-light by $\alpha 2$ (45°) in the second rotation direction which can be clockwise or counterclockwise, and then outputs them to the third birefringent crystal 150. The third birefringent crystal 150 is used to cause the first crystal forward o-light to generate a third displacement of the first crystal forward o-light, and the first crystal forward e-light to generate a third displacement of the first crystal forward e-light. Here, the sum of the first displacement of the first crystal forward o-light, the second displacement of the first crystal forward o-light, and the third displacement of the first crystal forward o-light is equal to the sum of the first displacement of the first crystal forward e-light, the second displacement of the first crystal forward e-light, and the third displacement of the first crystal forward e-light, and the first crystal forward o light and the first crystal forward e light are coincident with each other in response to exiting from the third birefringent crystal 150, achieving normal output of the forward light.

For the backward light, when it is incident on the third birefringent crystal 150 in the backward direction of the optical path, the third birefringent crystal 150 is used to separate the backward light into the third crystal backward o-light and the third crystal backward e-light whose polarization directions are perpendicular to each other, and outputs them to the second Faraday rotator 140. Inside the third birefringent crystal 150, the third crystal backward o-light generates a third displacement of the third crystal backward o-light, and the third crystal backward e-light generates a third displacement of the third crystal backward e-light. The second Faraday rotator 140 is used to rotate the polarization direction of the third crystal backward o-light and the third crystal backward e-light by $\alpha 2$ (45°) in the second rotation direction, and then outputs them to the second birefringent crystal 130. The second birefringent crystal 130 is used to cause the third crystal backward o-light to generate a second displacement of the third crystal backward o-light, and the third crystal backward e-light to generate a second displacement of the third crystal backward e-light, and then outputs them to the first Faraday rotator 120. The first Faraday rotator 120 is used to rotate the polarization direction of the third crystal backward o-light and the third crystal backward e-light by $\alpha 1$ (45°) in the first rotation direction, and then outputs them to the first birefringent crystal 110. The first birefringent crystal 110 is used to cause the third crystal backward o-light to generate a first displacement of the third crystal backward o-light, and the third crystal backward e-light to generate a first displacement of the third crystal backward e-light. Here, the sum of the third displacement of the third crystal backward o-light, second displacement of the third crystal backward o-light, and first displacement of the third crystal backward o-light causes the third crystal backward o-light to deviate from the forward optical path, and the sum of the third displacement of the third crystal backward e-light, second displacement of the third crystal backward e-light, and first displacement of the third crystal backward e-light causes the third crystal backward e-light to deviate from the forward optical path, thereby achieving isolation of the backward light.

In order to provide a detailed and specific explanation of the realization process of the isolator core 100, the embodiments of the present disclosure provides the following optical components firstly, and in the following specific embodiments, a detailed explanation is given for the displacement of the forward light and backward light by using the following optical components.

Figure 2A:
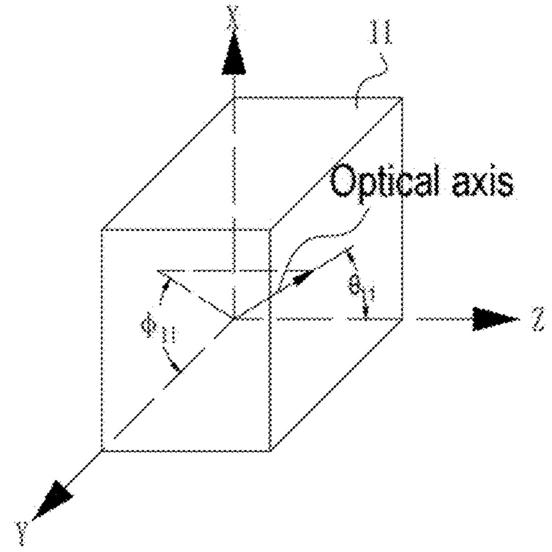
FIG. 2*a* is a schematic structural and optical axis diagram of a birefringent crystal A according to an embodiment of the present disclosure.
Figure 2B:
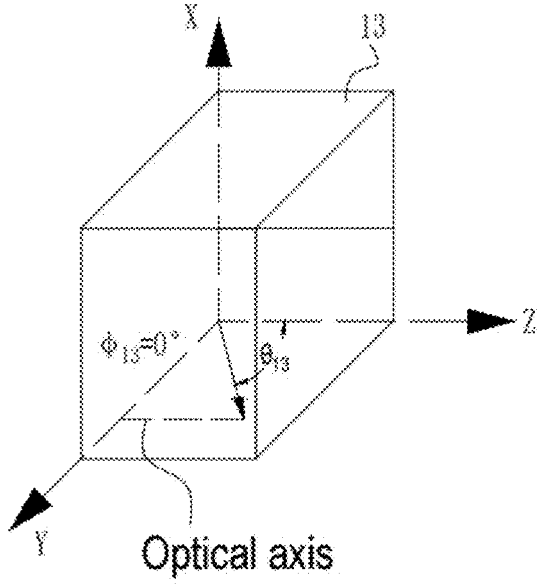
FIG. 2*b* is a schematic structural and optical axis diagram of a birefringent crystal B according to an embodiment of the present disclosure.
Figure 2C:
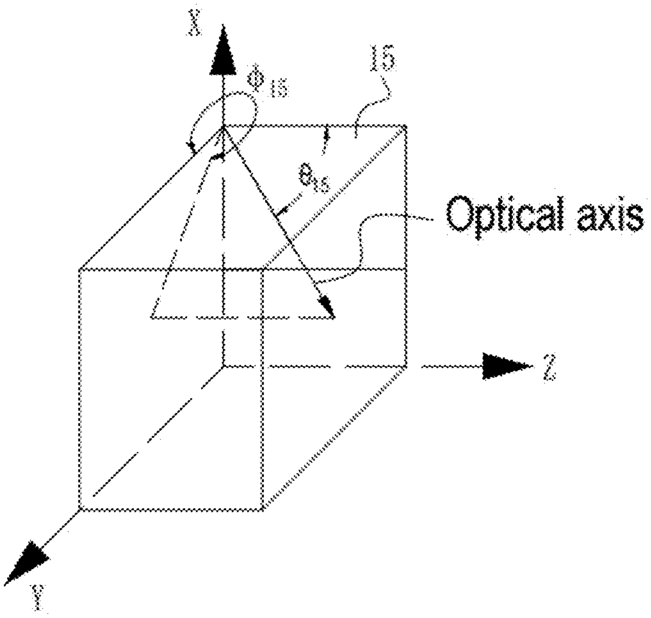
FIG. 2*c* is a schematic structural and optical axis diagram of a birefringent crystal C according to an embodiment of the present disclosure.

For ease of understanding the specific embodiments, the following explanation takes the normal incidence of forward light on the first birefringent crystal 110 as an example. The functionality provided by this embodiment is equally applicable to the case of oblique incidence of forward light. First, three birefringent crystals are provided as examples for illustration. In the specific embodiment, different alignment methods of the o-light and e-light of these three birefringent crystals can form different schemes. Please refer to FIGS. 2*a* to 2*c* and FIGS. 3*a* to 3*c*. FIGS. 2*a* to 2*c* show the structure and optical axis of the three birefringent crystals provided in the embodiment, and FIGS. 3*a* to 3*c* correspondingly show the displacement of forward and backward light passing through each birefringent crystal.

Figure 3A:
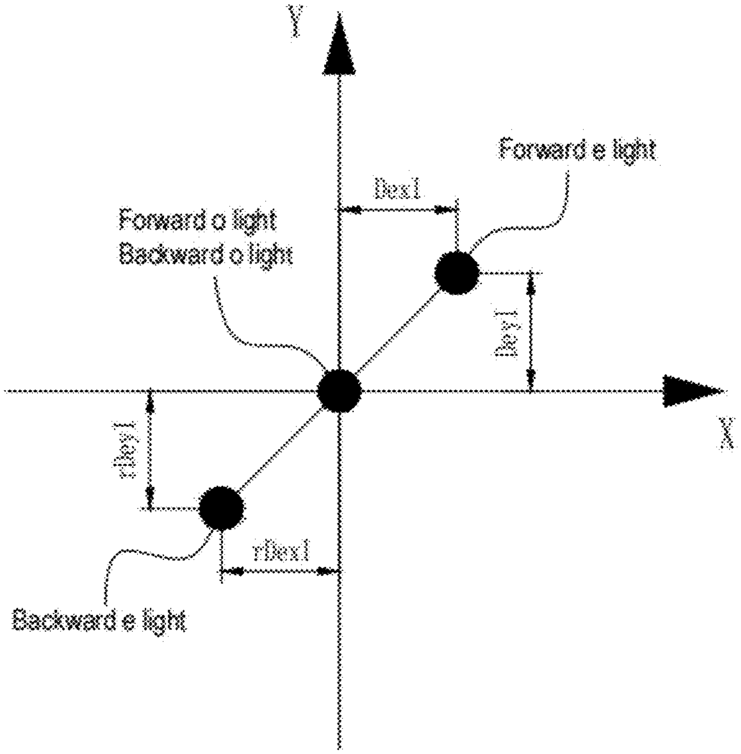
FIG. 3*a* is a schematic diagram of a displacement of forward light and backward light in the birefringent crystal A according to an embodiment of the present disclosure.

As shown in FIG. 2*a*, the angle $\theta$11 between the optical axis of birefringent crystal A11 and the normal line of its forward-light incidence surface is its walk-off angle. an xyz coordinate system is established with the forward direction of the optical path as the z-axis. (the same below), the line where the e-light oscillation plane through the optical axis of birefringent crystal A11 intersects with the xy plane forms an angle $\varphi$11=45° with the y-axis. As shown in FIG. 3*a*, in birefringent crystal A11, the displacement of forward o-light includes the x-axis displacement and y-axis displacement of the forward o-light. Under the condition of normal incidence, the x-axis displacement and y-axis displacement of the forward o-light are both zero, that is to say, the displacement of linearly polarized light propagating in the birefringent crystal in the o-light polarization state is always zero, the same below, no more repetition; the displacement of forward e-light includes the x-axis displacement DexI and y-axis displacement DeyI of the forward e-light, where DexI=DeyI=a. The displacement of backward e-light includes the x-axis displacement rDexI and y-axis displacement rDeyI of the backward e-light, where rDexI=rDeyI=–a.

Figure 3B:
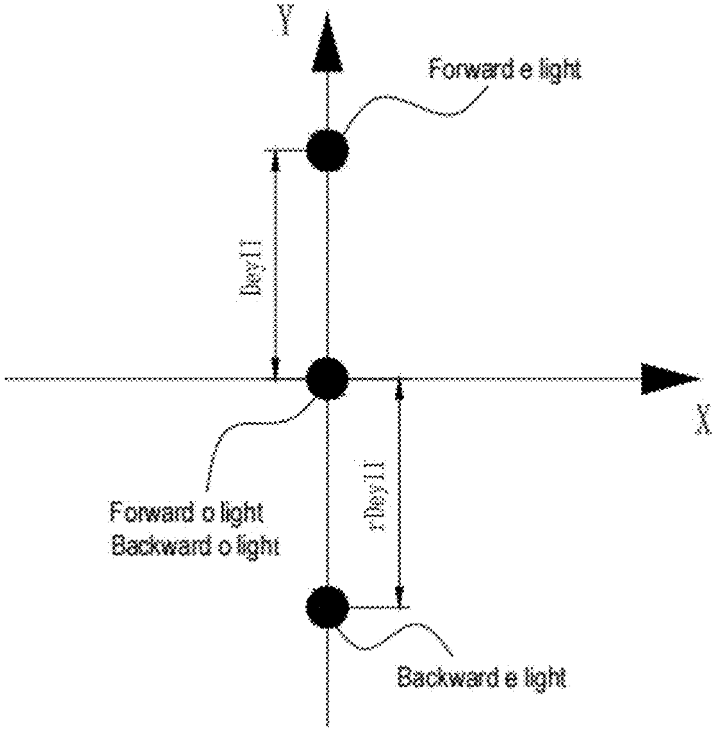
FIG. 3*b* is a schematic diagram of a displacement of forward light and backward light in the birefringent crystal B according to an embodiment of the present disclosure.

As shown in FIG. 2*b*, the angle $\theta$13 between the optical axis of birefringent crystal B13 and the normal line of its forward light incidence surface is its walk-off angle. The line where the e-light oscillation plane through the optical axis of birefringent crystal B13 intersects with the xy plane forms an angle $\varphi$13=0° with the y-axis. As shown in FIG. 3*b*, in birefringent crystal B13, the displacement of forward e-light includes the x-axis displacement DexII and y-axis displacement DeyII of the forward e-light, where DexII=0, DeyII=2a. The displacement of backward e-light includes the x-axis displacement rDexII and y-axis displacement rDeyII of the backward e-light, where rDexII=0, rDeyII=–2a.

Figure 3C:
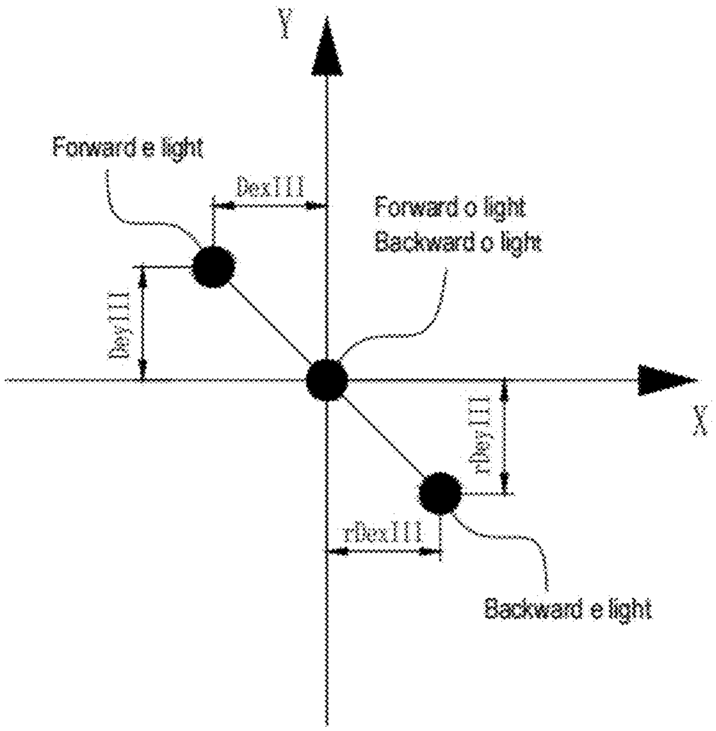
FIG. 3*c* is a schematic diagram of a displacement of forward light and backward light in the birefringent crystal C according to an embodiment of the present disclosure.

As shown in FIG. 2*c*, the angle θ15 between the optical axis of birefringent crystal C15 and the normal line of its forward light incidence surface is its walk-off angle. The line where the e-light oscillation plane through the optical axis of birefringent crystal C15 intersects with the xy plane forms an angle φ15=315° with the y-axis. As shown in FIG. 3*c*, in birefringent crystal C15, the displacement of forward e-light includes the x-axis displacement DexIII and the y-axis displacement DeyIII of the forward e-light, where DexIII=−a and DeyIII=a. The displacement of backward e-light includes the x-axis displacement rDexIII and the y-axis displacement rDeyIII of the backward e-light, where rDexIII-a and rDeyIII=−a.

In an optional embodiment, an xyz coordinate system is established with the forward direction of the optical path as the z-axis. the e-light oscillation plane where the optical axis of the first birefringent crystal 110 is located intersects with the xy plane at the first straight line, and the angle between the first straight line and the y-axis is φ1. The e-light oscillation plane where the optical axis of the second birefringent crystal 130 is located intersects with the xy plane at the second straight line, and the angle between the second straight line and the y-axis is φ2. The e-light oscillation plane where the optical axis of the third birefringent crystal 150 is located intersects with the xy plane at the third straight line, and the angle between the third straight line and the y-axis is φ3. Here, 0°≤φ1≤360°, |φ2−φ1|=(m·90+α1), where m is an integer within the range of 0 to 3, and |φ3−φ1|=(n·90°), where n is either 1 or 3. Specifically, for φ1, reference can be made to the description of φ11 in FIG. 2*a* regarding birefringent crystal A11; for φ2, reference can be made to the description of φ13 in FIG. 2*b* regarding birefringent crystal B13; for φ3, reference can be made to the description of φ15 in FIG. 2*c* regarding birefringent crystal C15. Specifically, 0°≤φ11=45°≤360°, φ13=0°, φ15=315°, |φ13−φ11|=|0°−45°|=45°, |φ15−φ11|=|315°−45°|=270°, satisfying the relationship: |φ2−φ1|=(m·90°+α1), where m is an integer within the range of 0 to 3, and |φ3−φ1|=(n·90°), where n is either 1 or 3. By setting φ1, φ2, and φ3 to satisfy this relationship, it is ensured that the polarization state of the first crystal forward o-light exiting the first birefringent crystal 110 can be aligned with the o-light or e-light polarization state of the second birefringent crystal 130 after passing through the first Faraday rotator 120, and can be aligned with the o-light or e-light polarization state of the third birefringent crystal 150 after passing through the second Faraday rotator 140.

Below is a detailed explanation of the displacement of forward light and backward light in the first embodiment:

First Embodiment

In this example, the first birefringent crystal 110 uses the aforementioned birefringent crystal A11, the second birefringent crystal 130 uses the aforementioned birefringent crystal B13, and the third birefringent crystal 150 uses the aforementioned birefringent crystal C15. From the perspective of the forward optical path, the rotation direction of the first Faraday rotator 120 and the second Faraday rotator 140 is both counterclockwise. The polarization state of the first crystal forward o-light in the first birefringent crystal 110—second birefringent crystal 130—third birefringent crystal 150 is successively o-e-o.

Figure 4A:
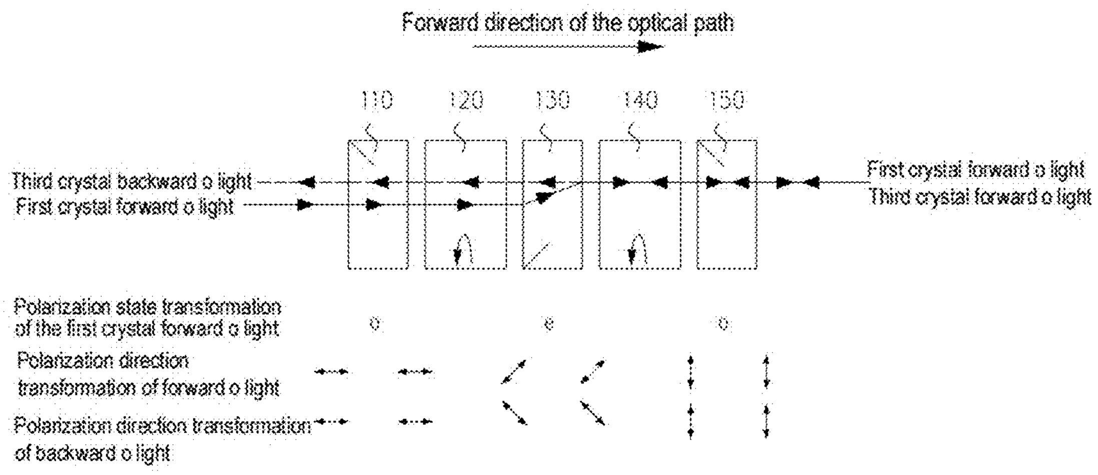
FIG. 4*a* is a schematic diagram of optical paths and polarization state transformation of first crystal forward o light and third crystal backward o light according to the first embodiment of the present disclosure.
Figure 4B:
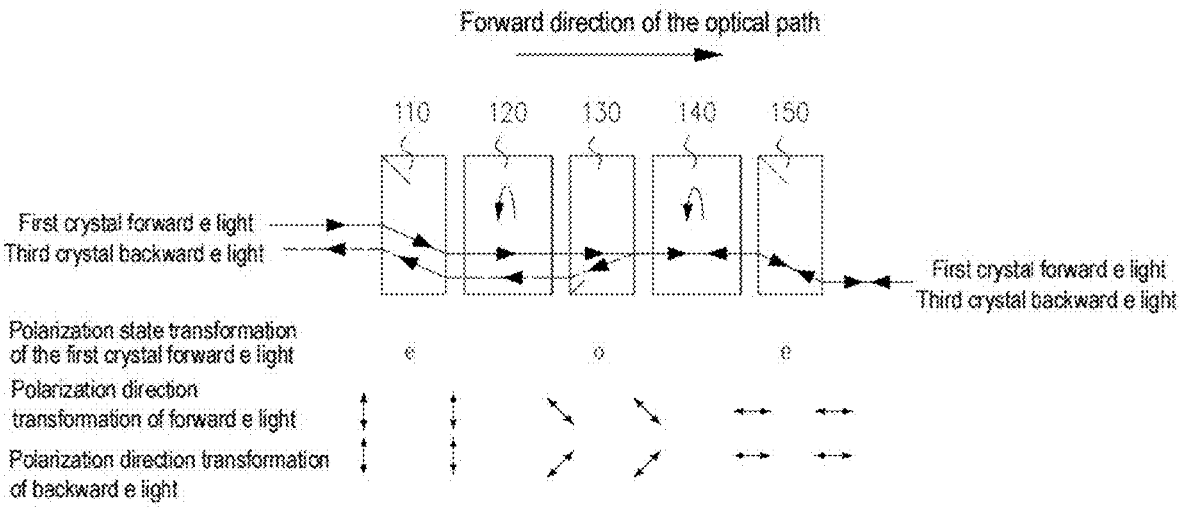
FIG. 4*b* is a schematic diagram of optical paths and polarization state transformation of first crystal forward e light and third crystal backward e light according to the first embodiment of the present disclosure.
Figure 5A:
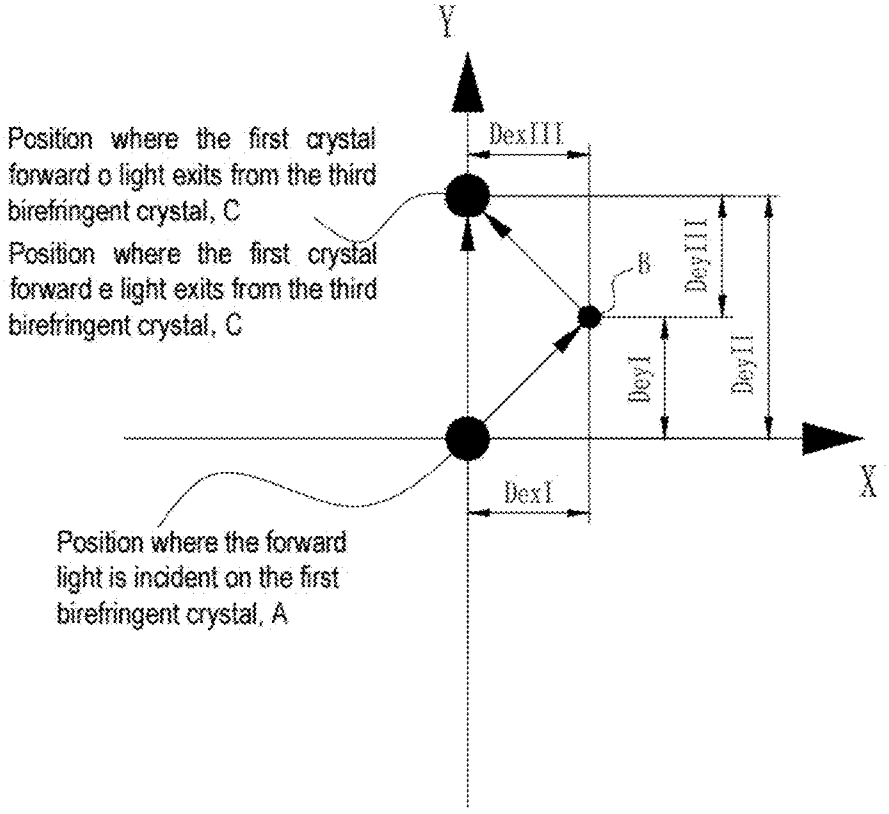
FIG. 5*a* is a schematic diagram of a displacement of the first crystal forward o-light and the first crystal forward e-light in the optical isolator core according to the first embodiment of the present disclosure.

Refer to FIGS. 4*a* and 4*b* for the forward optical path; the first crystal forward o-light propagates in the o-light polarization state in both the first birefringent crystal 110 and the third birefringent crystal 150, with no deviation of the optical path, thus the first displacement of the first crystal forward o-light and the third displacement of the first crystal forward o-light are both zero. The first crystal forward o-light propagates in the e-light polarization state in the second birefringent crystal 130, resulting in an optical path deviation, with the second displacement of the first crystal forward o-light including the second x-axis displacement DexII and the second y-axis displacement DeyII of the first crystal forward o-light. Conversely, the first crystal forward e-light propagates in the e-light polarization state in the first birefringent crystal 110 and the third birefringent crystal 150, resulting in an optical path deviation, with the first displacement of the first crystal forward e-light including the first x-axis displacement DexI and the first y-axis displacement DeyI of the first crystal forward e-light, and the third displacement of the first crystal forward e-light including the third x-axis displacement DexIII and the third y-axis displacement DeyIII of the first crystal forward e-light. The specific displacement of the forward light is shown in FIG. 5*a*, with the position where the forward light is incident on the first birefringent crystal 110 as the origin to establish the xy coordinate system. The incidence point of the first crystal forward o-light is point A (0,0), with no displacement in the first birefringent crystal 110 and the third birefringent crystal 150. In the second birefringent crystal 130, it is displaced along the x-axis by DexII=0 and along the y-axis by DeyII=2a, and finally exits at point C (0,2a) of the third birefringent crystal 150. The incidence point of the first crystal forward e-light is also point A (0,0), where it is displaced along the x-axis by DexI=a and along the y-axis by DeyI=a in the first birefringent crystal 110, exiting at point B (a,a). In the second birefringent crystal 130, there is no displacement, and in the third birefringent crystal 150, it is displaced along the x-axis by DexIII=−a and along the y-axis by DeyIII=a, finally also exiting at point C (0,2a) of the third birefringent crystal 150. It can be seen that the first crystal forward o-light and the first crystal forward e-light merge into one beam when exiting the third birefringent crystal 150, achieving normal output of the forward light.

Figure 5B:
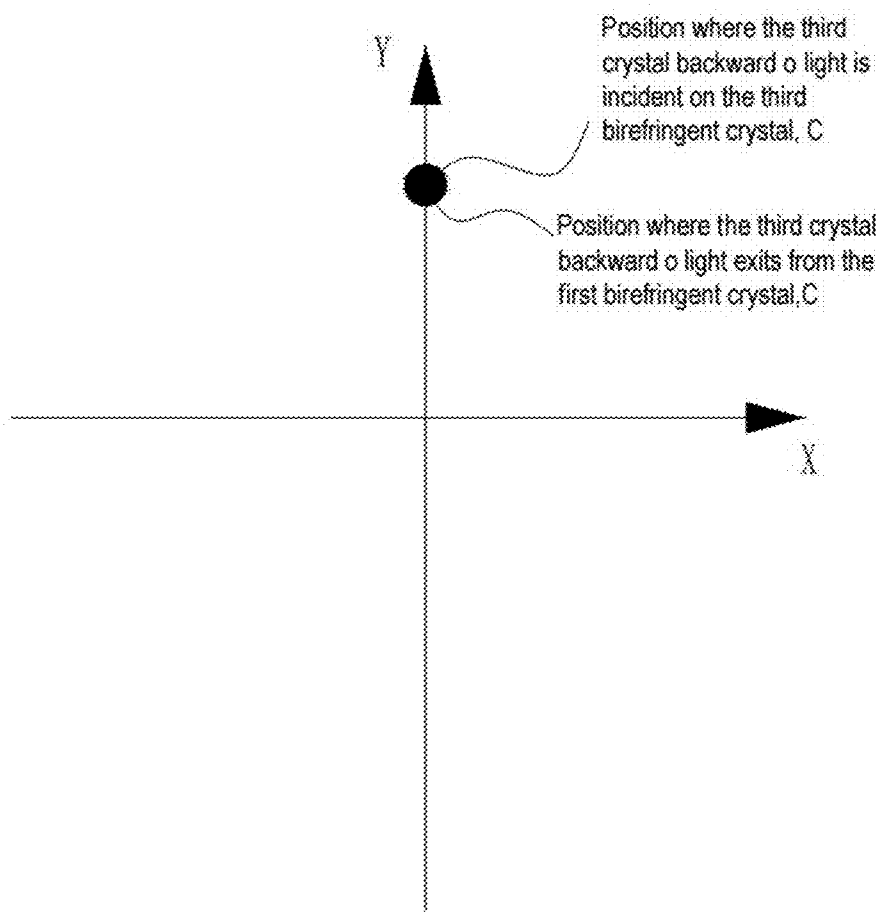
FIG. 5*b* is a schematic diagram of a displacement of the third crystal backward o-light in the optical isolator core according to the first embodiment of the present disclosure.

For the third crystal backward o-light, as shown in FIG. 4*a*, the third crystal backward o-light does not deviate in the third birefringent crystal 150. After passing through the second Faraday rotator 140 and rotating counterclockwise, the polarization direction forms a 90° rotation relative to the first crystal forward o-light. The polarization states of the third crystal backward o-light and the first crystal forward o-light undergo an o-light to e-light conversion in the second birefringent crystal 130, the third crystal backward o-light still propagates in the second birefringent crystal 130 in the o-light polarization state with no deviation, thus deviate from the forward optical path to form the first stage of isolation. After passing through the first Faraday rotator 120 and rotating counterclockwise again, the third crystal backward o-light propagates in the first birefringent crystal 110 in the o-light polarization state, also without deviation. In the optical path between the forward input plane of the first birefringent crystal 110 and the forward output plane of the second birefringent crystal 130, for the forward light and backward light with the same polarization state in the second birefringent crystal 130, after the first Faraday rotator 120 rotates by α1 angle in the first rotation direction, the backward light forms a 90° rotation in polarization state relative to the forward light in the first birefringent crystal 110, with o-light and e-light conversion, causing the third crystal backward o-light to deviate again from the forward optical path in the first birefringent crystal 110, forming a second stage of isolation. The specific displacement is shown in FIG. 5*b*, where the third crystal backward o-light is incident at point C (0, 2a) on the third birefringent crystal 150 and finally exit from the first birefringent crystal 110 at the same point C, deviating from the forward light incidence point A (0, 0) and achieving backward isolation.

Figure 5C:
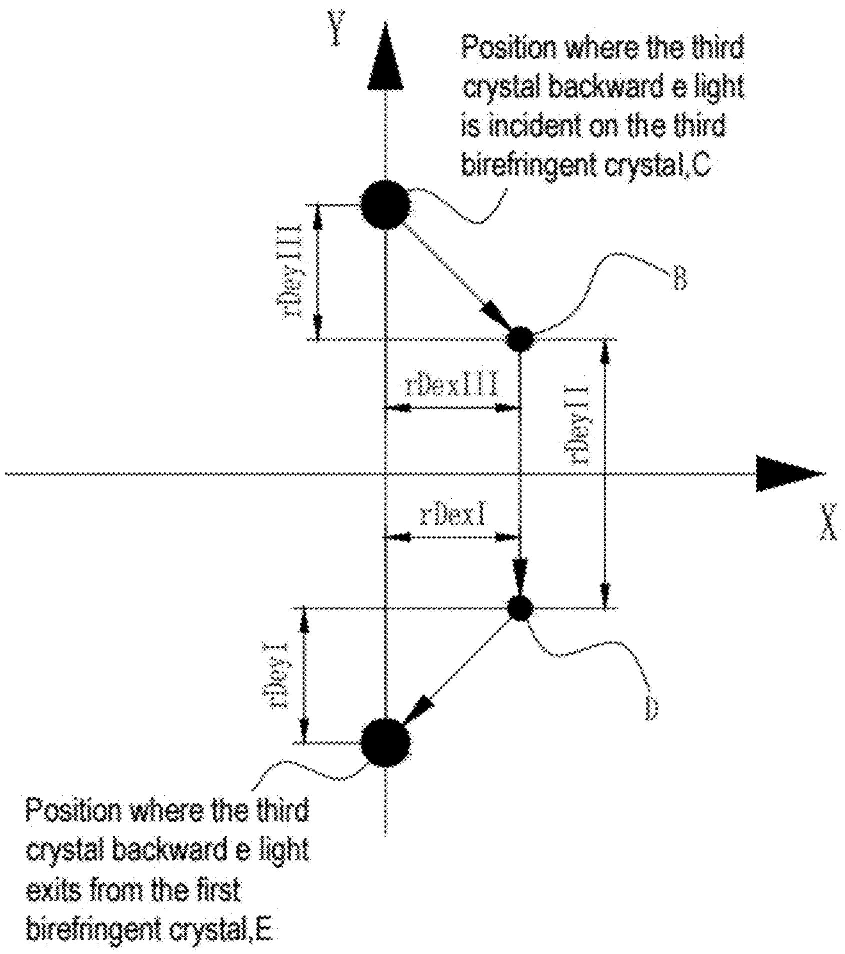
FIG. 5*c* is a schematic diagram of a displacement of the third crystal backward e-light in the optical isolator core according to the first embodiment of the present disclosure.

Conversely, for the third crystal backward e-light as shown in FIG. 4*b*, the third crystal backward e-light propagates in the e-light polarization state and deviate in all the third birefringent crystal 150, the second birefringent crystal 130, and the first birefringent crystal 110. The third displacement of the third crystal backward e-light in the third birefringent crystal 150 includes the third x-axis displacement rDexIII and the third y-axis displacement rDeyIII of the third crystal backward e-light. The second displacement in the second birefringent crystal 130 includes the second x-axis displacement rDexII and the second y-axis displacement rDeyII of the third crystal backward e-light. The first displacement in the first birefringent crystal 110 includes the first x-axis displacement rDexI and the first y-axis displacement rDeyI of the third crystal backward e-light. The specific displacement is shown in FIG. 5*c*, where the third crystal backward e-light is incident at point C (0, 2a) on the third birefringent crystal 150 and is displaced along the x-axis by rDexIII=a and along the y-axis by rDeyIII=−a in the third birefringent crystal 150, then exit the third birefringent crystal 150 at point B (a, a) and enter the second birefringent crystal 130. The third crystal backward e-light is displaced along the x-axis by rDexII=0 and along the y-axis by rDeyII=−2a in the second birefringent crystal 130, then exit the second birefringent crystal 130 at point D (a, −a) and enter the first birefringent crystal 110. The third crystal backward e-light is displaced along the x-axis by rDexI=−a and along the y-axis by rDeyI=−a in the first birefringent crystal 110, finally exit the first birefringent crystal 110 at point E (0, −2a), also deviate from the forward light incidence point A (0, 0) and achieving backward isolation.

In summary, the first crystal forward o-light and the first crystal forward e-light are both incident into the first birefringent crystal 110 at point A (0, 0), and finally both are exited the third birefringent crystal 150 at point C (0, 2a), achieving normal output of the forward light. The third crystal backward o-light and the third crystal backward e-light are both incident into the third birefringent crystal 150 in the reverse direction at point C (0, 2a), and finally the third crystal backward o-light is still exited the first birefringent crystal 110 at point C (0, 2a), while the third crystal backward e-light is exited the first birefringent crystal 110 at point E (0, −2a). Both deviate from the forward light incidence point A (0, 0), achieving the dual-stage isolation function of the backward light.

It should be noted that the above first embodiment is merely illustrative, and its description of the deviation of the optical path, the direction of deviation, and the distance of deviation does not constitute a limitation of the embodiments of the present disclosure. Based on the structure proposed in the embodiments of the present disclosure, by reasonably designing the φ angles of optical axis and the relative displacement of o-light and e-light of the first birefringent crystal 110, the second birefringent crystal 130, and the third birefringent crystal 150, reasonably designing the rotation direction of the first Faraday rotator 120 and the second Faraday rotator 140, and reasonably designing the polarization state relationships of o-light and e-light among the birefringent crystals, finally achieve the result that the sum of the displacements of the first crystal forward o-light in the three crystals is equal to that of the first crystal forward e-light, then the first crystal forward o-light and the first crystal forward e-light is coupled and normally output; and the sum of the displacements of both the third crystal backward o-light and the third crystal backward e-light in the three crystals deviates from the forward optical path, then the third crystal backward o-light and the third crystal backward e-light is isolated. All these schemes should be included in the scope of protection of the embodiments of the present disclosure.

The optical isolator core 100 provided in the embodiments of the present disclosure is designed for non-collimating beam (converging or diverging beam, with converging beam used as an example in FIG. 1). An arbitrary polarization state light is separated into o-light and e-light in a birefringent crystal and forms the relative displacement between o-light and e-light, and the Faraday rotators rotate the polarization states of the forward and backward light in the same direction, these feature is utilized to achieve the coupling and normal output of forward o-light and forward e-light and the dual-stage isolation of backward o-light and backward e-light. Moreover, all optical components in the optical isolator core 100 are of a parallel plate structure, which is simple in structure, easy to manufacture, conducive to reducing production costs. The number of required optical components is relatively small and it results in further cost reduction.

In an optional embodiment, the polarization direction of the first crystal forward o-light after passing through the first Faraday rotator 120 aligns with the o-light or e-light polarization state of the second birefringent crystal 130. In an optional embodiment, the polarization direction of the first crystal forward o-light after passing through the second Faraday rotator 140 aligns with the o-light or e-light polarization state of the third birefringent crystal 150. It can be understood that the polarization state of the first crystal forward o-light can successively be o-o-o, o-o-e, o-e-o, or o-e-e in the first birefringent crystal 110—second birefringent crystal 130—third birefringent crystal 150.

In an optional embodiment, the angles between the normal of the forward light incidence surfaces and the optical axes of the first birefringent crystal 110, the second birefringent crystal 130, and the third birefringent crystal 150 are the walk-off angles θ1, θ2, and θ3 respectively. Here, 0°<θ1<90° or −90°<θ1<0°, 0°<θ2<90° or −90°<θ2<0°, 0°<θ3<90° or −90°<θ3<0°. The walk-off angles are used to control the relative walk-off between the o-light and e-light after passing through their corresponding birefringent crystals.

Specifically, θ1 can refer to the description of θ11 of the birefringent crystal in FIG. 2*a*; θ2 can refer to the description of θ13 of the birefringent crystal in FIG. 2*b*; θ3 can refer to the description of θ15 of the birefringent crystal in FIG. 2*c*.

Figure 6:
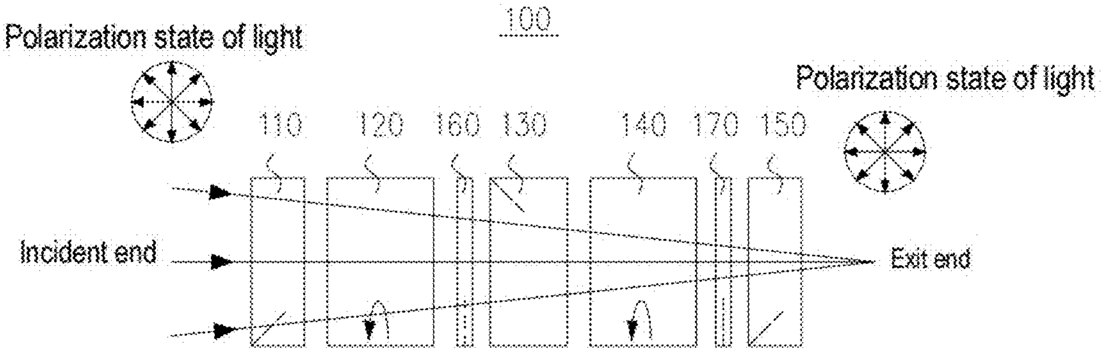
FIG. 6 is a schematic structural and optical path diagram of an optical isolator core with a half-wave plate according to an embodiment of the present disclosure.

Refer to FIG. 6, it illustrates the structure of the optical isolator core and the forward optical path provided in another embodiments of the present disclosure. As shown in the figure, in this optional embodiment, the optical isolator core 100 also includes a first half-wave plate 160 located between the first birefringent crystal 110 and the second birefringent crystal 130, and a second half-wave plate 170 located between the second birefringent crystal 130 and the third birefringent crystal 150. Both the first half-wave plate 160 and the second half-wave plate 170 have a parallel plate structure. It should be noted that, the first half-wave plate 160 can be set between the first Faraday rotator 120 and the second birefringent crystal 130 as shown in FIG. 6, or it can be set between the first birefringent crystal 110 and the first Faraday rotator 120; similarly, the second half-wave plate 170 can be set between the second Faraday rotator 140 and the third birefringent crystal 150 as shown in FIG. 6, or it can be set between the second birefringent crystal 130 and the second Faraday rotator 140.

The first half-wave plate 160 is used to rotate the polarization directions of the first crystal forward o-light and the first crystal forward e-light by (2βo1) and (2βe1) respectively. Here, βo1 is the angle between the line where the oscillation plane of the first crystal forward o-light intersects with the incidence surface of the first half-wave plate 160 and the optical axis of the first half-wave plate 160. βe1 is the angle between the line where the oscillation plane of the first crystal forward e-light intersects with the incidence surface of the first half-wave plate 160 and the optical axis of the first half-wave plate 160. |βo1−βe1|=90°, and βo1=±22.5° or ±67.5°, βe1=±22.5° or ±67.5° (from the perspective of the forward light, a counterclockwise rotation of the projection of the first crystal forward o-light on the incidence surface to coincide with the optical axis of the first half-wave plate 160 is positive, and a clockwise rotation is negative; the same applies to the first crystal forward e-light and the following text). The first half-wave plate 160 is also used to rotate the polarization directions of the third crystal backward o-light and the third crystal backward e-light by (2βro1) and (2βre1) respectively. Here, βro1 is the angle between the line where the oscillation plane of the third crystal backward o-light intersects with the incidence surface of the first half-wave plate 160 and the optical axis of the first half-wave plate 160. βre1 is the angle between the line where the oscillation plane of the third crystal backward e-light intersects with the incidence surface of the first half-wave plate 160 and the optical axis of the first half-wave plate 160. |βro1−βre1|=90°, and βro1=±22.5° or ±67.5°, βre1=±22.5° or ±67.5°.

The second half-wave plate 170 is used to rotate the polarization directions of the first crystal forward o-light and the first crystal forward e-light by (2βo2) and (2βe2) respectively. Here, βo2 is the angle between the line where the oscillation plane of the first crystal forward o-light intersects with the incidence surface of the second half-wave plate 170 and the optical axis of the second half-wave plate 170. βe2 is the angle between the line where the oscillation plane of the first crystal forward e-light intersects with the incidence surface of the second half-wave plate 170 and the optical axis of the second half-wave plate 170. |βo2−βe2|=90°, and βo2=±22.5° or ±67.5°, βe2=±22.5° or ±67.5°. The second half-wave plate 170 is also used to rotate the polarization directions of the third crystal backward o-light and the third crystal backward e-light by (2βro2) and (2βre2) respectively. Here, βro2 is the angle between the line where the oscillation plane of the third crystal backward o-light intersects with the incidence surface of the second half-wave plate 170 and the optical axis of the second half-wave plate 170. βre2 is the angle between the line where the oscillation plane of the third crystal backward e-light intersects with the incidence surface of the second half-wave plate 170 and the optical axis of the second half-wave plate 170. |βro1−βre1|=90°, and βro2=±22.5° or ±67.5°, βre2=±22.5° or ±67.5°.

To provide a detailed and specific explanation of the realization process of the isolator core 100 with half-wave plates, the following optical components are provided firstly, and these optical components are used to provide a detailed explanation of the displacement of forward and backward light in following embodiment.

Figure 7A:
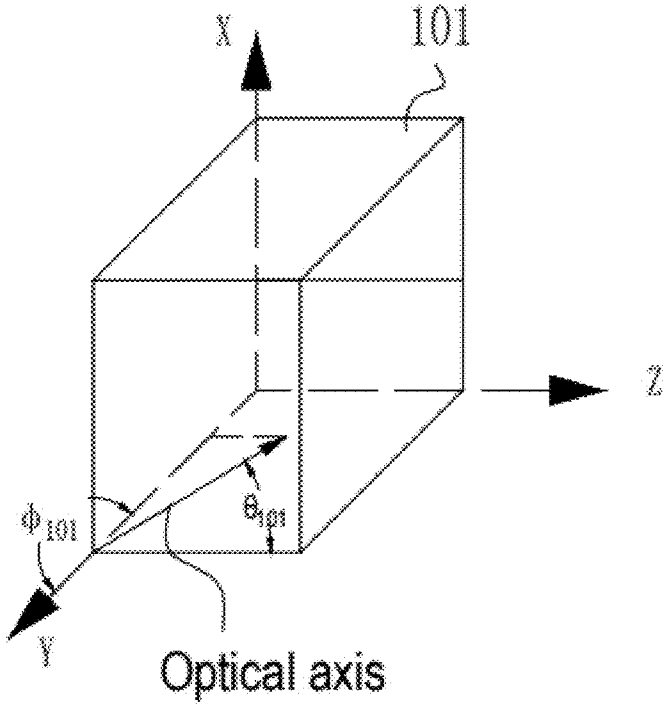
FIG. 7*a* is a schematic structural and optical axis diagram of a birefringent crystal D according to an embodiment of the present disclosure.
Figure 7B:
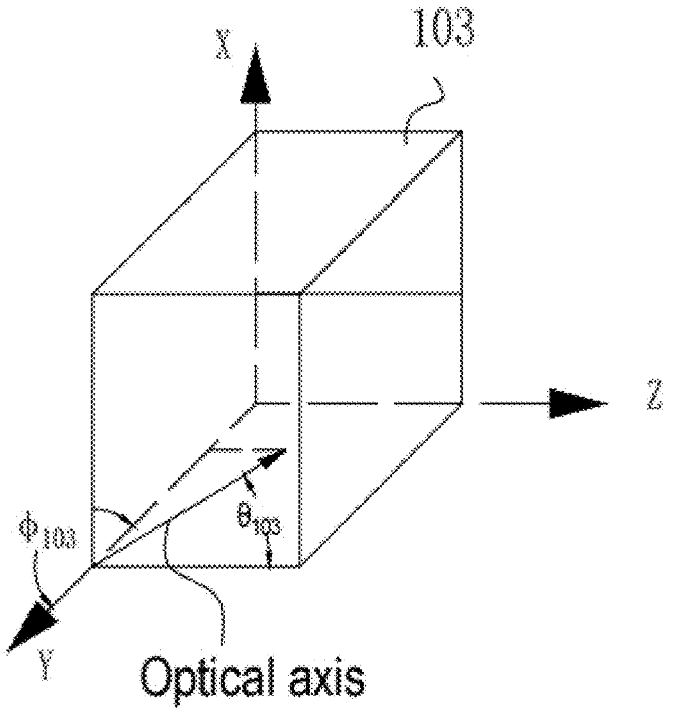
FIG. 7*b* is a schematic structural and optical axis diagram of a birefringent crystal E according to an embodiment of the present disclosure.
Figure 7C:
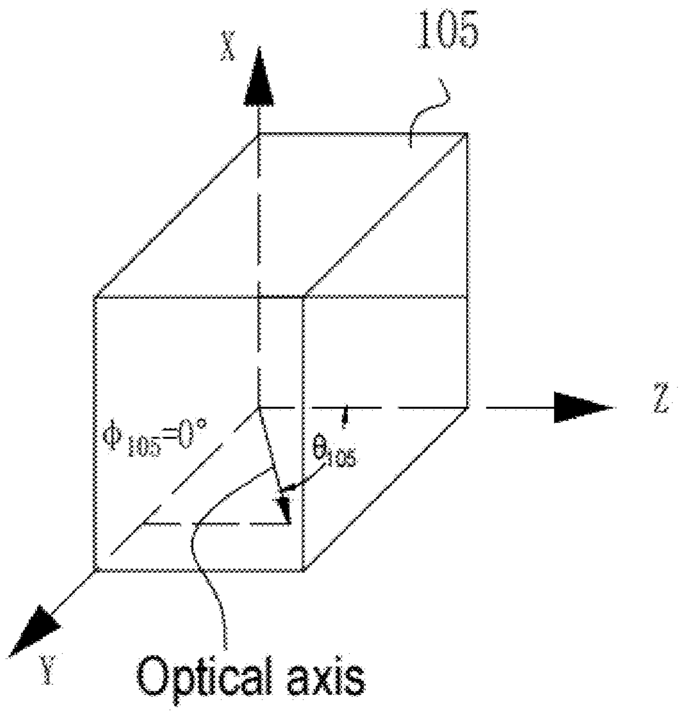
FIG. 7*c* is a schematic structural and optical axis diagram of a birefringent crystal F according to an embodiment of the present disclosure.

Refer to FIGS. 7*a* to 7*c* and FIGS. 8*a* to 8*c*. FIGS. 7*a* to 7*c* show the structure and optical axis of the three birefringent crystals provided in this embodiment of the present disclosure, and FIGS. 8*a* to 8*c* correspondingly show the displacement of forward and backward light passing through each birefringent crystal.

Figure 8A:
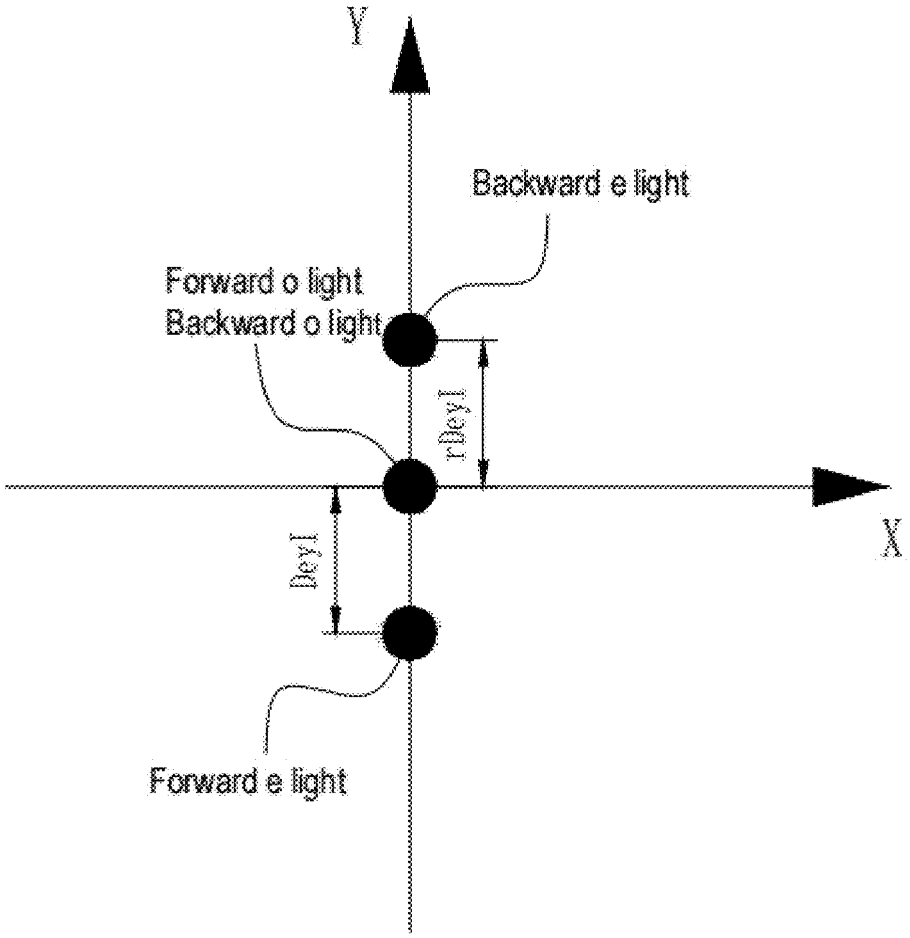
FIG. 8*a* is a schematic diagram of a displacement of forward light and backward light in the birefringent crystal D according to an embodiment of the present disclosure.

As shown in FIG. 7*a*, the angle θ101 between the optical axis of birefringent crystal D101 and the normal to its forward light incidence surface is its walk-off angle. The line where the e-light oscillation plane through the optical axis of birefringent crystal D101 intersects with the xy plane forms an angle φ101=180° with the y-axis. As shown in FIG. 8*a*, within birefringent crystal D101, the displacement of forward o-light includes the x-axis displacement and y-axis displacement of the forward o-light. Under the condition of normal incidence, the x-axis displacement and y-axis displacement of the forward o-light are both zero, that is, the displacement of linearly polarized light propagating in the birefringent crystal in the o-light polarization state is always zero, the same below, no more repetition; the displacement of forward e-light includes the x-axis displacement DexI and y-axis displacement DeyI of the forward e-light, where DexI=0, DeyI=−a. The displacement of backward e-light includes the x-axis displacement rDexI and y-axis displacement rDeyI of the backward e-light, where rDexI=0, rDeyI=a.

Figure 8B:
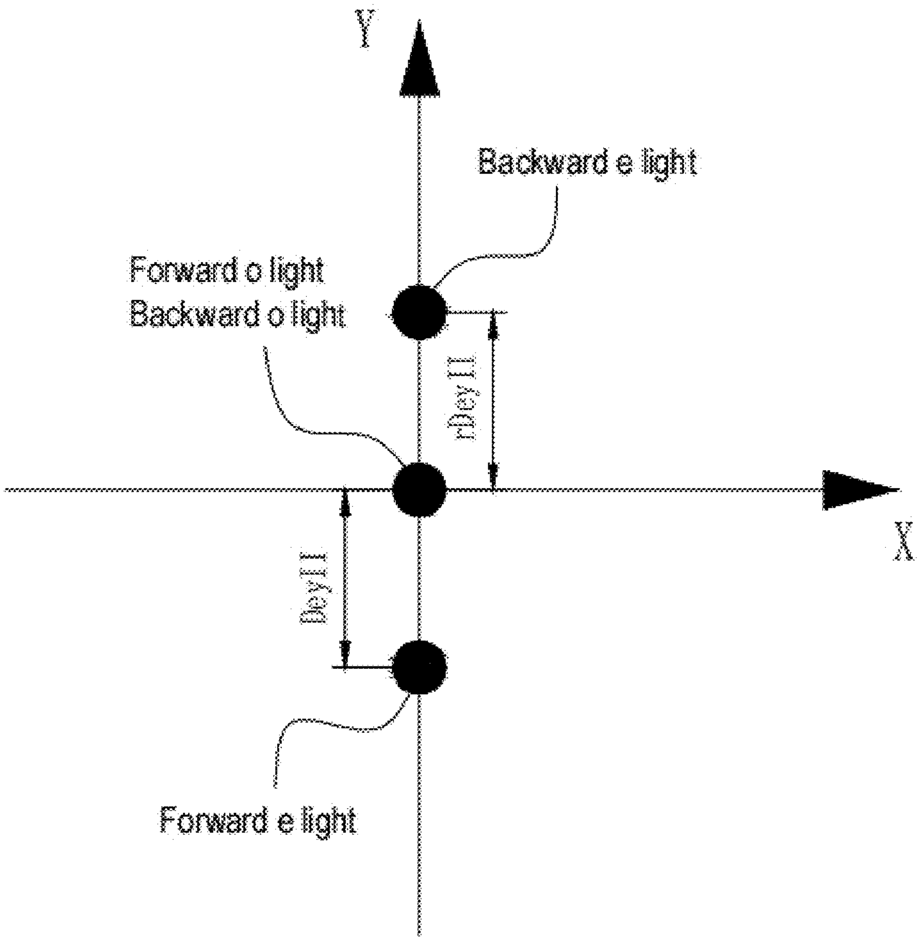
FIG. 8*b* is a schematic diagram of a displacement of forward light and backward light in the birefringent crystal E according to an embodiment of the present disclosure.

As shown in FIG. 7*b*, the angle θ103 between the optical axis of birefringent crystal E103 and the normal to its forward light incidence surface is its walk-off angle. The line where the e-light oscillation plane through the optical axis of birefringent crystal E103 intersects with the xy plane forms an angle φ103=180° with the y-axis. As shown in FIG. 8*b*, within birefringent crystal E103, the displacement of forward e-light includes the x-axis displacement DexII and y-axis displacement DeyII of the forward e-light, where DexII=0, DeyII=−b. The displacement of backward e-light includes the x-axis displacement rDexII and y-axis displacement rDeyII of the backward e-light, where rDexII=0, rDeyII=b.

Figure 8C:
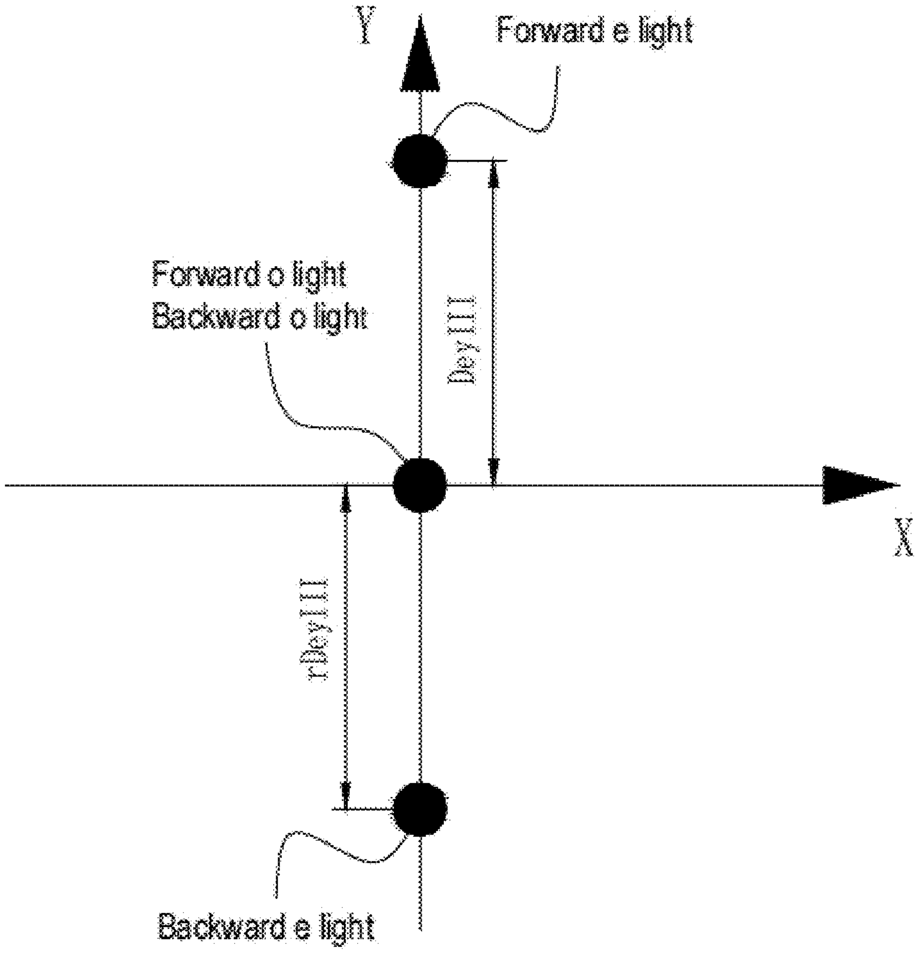
FIG. 8*c* is a schematic diagram of a displacement of forward light and backward light in the birefringent crystal F according to an embodiment of the present disclosure.

As shown in FIG. 7*c*, the angle θ105 between the optical axis of birefringent crystal F105 and the normal to its forward light incidence surface is its walk-off angle. The line where the e-light oscillation plane through the optical axis of birefringent crystal F105 intersects with the xy plane forms an angle φ105=0° with the y-axis. As shown in FIG. 8*c*, within birefringent crystal F105, the displacement of forward e-light includes the x-axis displacement DexIII and y-axis displacement DeyIII of the forward e-light, where DexIII=0, DeyIII=a+b. The displacement of backward e-light includes the x-axis displacement rDexIII and y-axis displacement rDeyIII of the backward e-light, where rDexIII=0, rDeyIII=−(a+b).

For an optical isolator core that adopts half-wave plates, in an optional embodiment, an xyz coordinate system is established with the forward direction of the optical path as the z-axis. The e-light oscillation plane where the optical axis of the first birefringent crystal 110 is located intersects with the xy plane at the first straight line, and the angle between the first straight line and the y-axis is φ1; the e-light oscillation plane where the optical axis of the second birefringent crystal 130 is located intersects with the xy plane at the second straight line, and the angle between the second straight line and the y-axis is φ2; the e-light oscillation plane where the optical axis of the third birefringent crystal 150 is located intersects with the xy plane at the third straight line, and the angle between the third straight line and the y-axis is φ3; where 0°≤φ1≤360°, |φ2−φ1|=0° or 180°, |φ3−φ1|=0° or 180°. Specifically, φ1 can refer to the description of φ101 in FIG. 7*a* regarding birefringent crystal D101; φ2 can refer to the description of φ103 in FIG. 7*b* regarding birefringent crystal E103; φ3 can refer to the description of φ105 in FIG. 7*c* regarding birefringent crystal F105. Specifically, 0°≤φ101=180°≤360°, |φ130−φ101|=|180°−180°|=0°, |φ105−φ101|=|0°−180°|=180°, satisfying the relationship: |φ2−φ1|=0° or 180°, |φ3−100 1|=0° or 180°.

Figure 9:
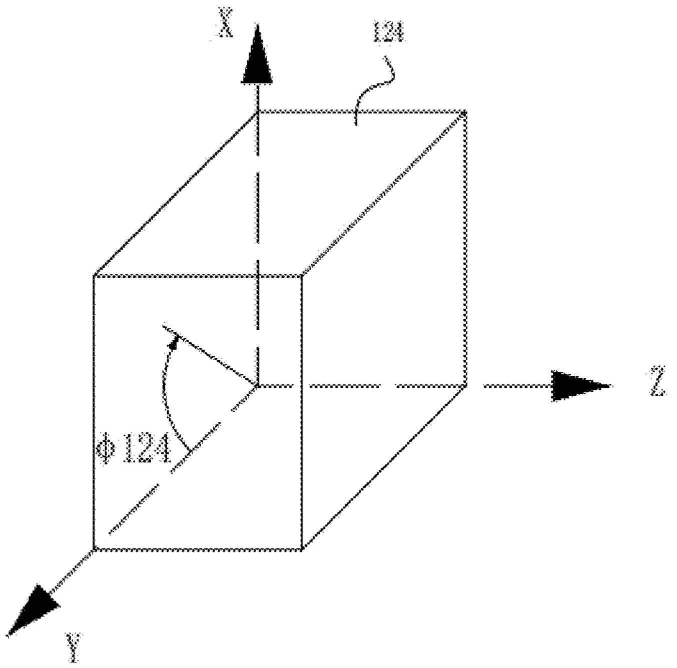
FIG. 9 is a schematic structural and Faraday rotation direction diagram of a Faraday rotator according to an embodiment of the present disclosure.
Figure 10:
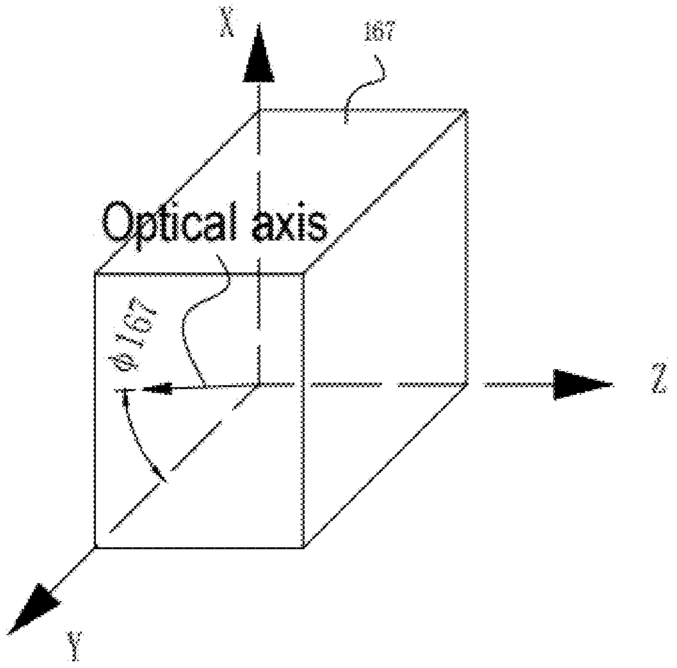
FIG. 10 is a schematic structural and optical axis diagram of a half-wave plate according to an embodiment of the present disclosure.

Additionally, a Faraday rotator and a half-wave plate are provided. As shown in FIG. 9, the rotation angle of the Faraday rotator 124, φ124=45°. As shown in FIG. 10, the angle between the optical axis of the half-wave plate 167 and the y-axis, φ167=22.5°.

Furthermore, in an optional embodiment, the projection of the optical axis of the first half-wave plate 160 in the xy plane is the fourth straight line, and the angle between the fourth straight line and the y-axis is φ4. The projection of the optical axis of the second half-wave plate in the xy plane is the fifth straight line, and the angle between the fifth straight line and the y-axis is φ5. Where |φ4−φ1|=22.5°, 67.5°, 112.5°, or 157.5°, and |φ5−φ2|=22.5°, 67.5°, 112.5°, or 157.5°.

Specifically, φ4 and φ5 can refer to φ167 of the half-wave plate 167 provided in FIG. 10. |φ4−φ1| and |φ5−φ2| can refer to φ167 of the half-wave plate 167 provided in FIGS. 10 and φ101 of birefringent crystal D101 and φ103 of birefringent crystal E103 provided in FIGS. 7*a* and 7*b* respectively. |φ167−φ101|=|22.5°−180°|=157.5°, |φ167−φ103|=|22.5°−180°|=157.5°, satisfying the aforementioned relationship.

Below is a detailed explanation of the displacement of forward light and backward light in the second embodiment:

Second Embodiment

In this embodiment, the first birefringent crystal 110 uses the aforementioned birefringent crystal D101, the second birefringent crystal 130 uses the aforementioned birefringent crystal E103, and the third birefringent crystal 150 uses the aforementioned birefringent crystal F105. Both the first Faraday rotator 120 and the second Faraday rotator 140 use the Faraday rotator 124 as shown in the aforementioned FIG. 9. Both the first half-wave plate 160 and the second half-wave plate 170 use the half-wave plate 167 as shown in the aforementioned FIG. 10. The polarization state of the first crystal forward o-light in the first birefringent crystal 110—second birefringent crystal 130—third birefringent crystal 150 is successively o-o-o.

In this embodiment, the first crystal forward o-light, the first crystal forward e-light, the third crystal backward o-light, and the third crystal backward e-light all undergo a polarization state rotation of 45° when passing through the first Faraday rotator 120 and the second Faraday rotator 140 (from the perspective of the forward light, that is, from left to right, counterclockwise rotation is positive, and clockwise rotation is negative, the same below). When light is transmitted forward and exit the first birefringent crystal 110, the oscillation planes of the first crystal forward o-light and the first crystal forward e-light are at angles of φo=90° (parallel to the x-axis) and φe=0° (parallel to the y-axis) with the y-axis respectively. After rotating 45° by the first Faraday rotator 120, the angles between the y-axis and the oscillation planes of the first crystal forward o-light and the first crystal forward e-light are −45° (taking the supplementary angle of 135°) and 45° respectively, the angles between the optical axis of the first half-wave plate 160 and the oscillation planes of the first crystal forward o-light and the first crystal forward e-light are βo1=67.5° and βe1=−22.5° respectively. After rotating by (2*βo1=135°) and (2*βe1=−45°) through the first half-wave plate 160, the angles between the y-axis and the oscillation planes of the first crystal forward o-light and the first crystal forward e-light are φo1=(−45°)+135°=90° and φe1=45°+(−45°)=0° respectively. Therefore, the oscillation plane of the first crystal forward o-light is still parallel to the x-axis, and the oscillation plane of the first crystal forward e-light is still parallel to the y-axis, and the first crystal forward o-light still propagates in the second birefringent crystal 130 in the o-light polarization state.

The first Faraday rotator 120 and the second Faraday rotator 140 both use the Faraday rotator 124 shown in FIG. 9, and the first half-wave plate 160 and the second half-wave plate 170 both use the half-wave plate 167 shown in FIG. 10. Therefore, when the first crystal forward o-light and the first crystal forward e-light exit the second birefringent crystal 130, their polarization state changes in the second Faraday rotator 140 and the second half-wave plate 170 are same to those in the first Faraday rotator 120 and the first half-wave plate 160, thus φo2=(−45°)+135°=90° and φe2=45°+(−45°)=0°. The oscillation plane of the first crystal forward o-light is still parallel to the x-axis, and the oscillation plane of the first crystal forward e-light is still parallel to the y-axis, and the first crystal forward o-light still propagates in the third birefringent crystal 150 in the o-light polarization state.

When light is transmitted in the backward direction, the oscillation planes of the third crystal backward o-light and the third crystal backward e-light exiting the third birefringent crystal 150 are at angles of φro=90° (parallel to the x-axis) and φre=0° (parallel to the y-axis) with the y-axis respectively. The angles with the optical axis of second half-wave plate 170 are βro2=−67.5° and βre2=22.5° respectively. After rotating by (2*βro2=−135°) and (2*βre2=45°) through the second half-wave plate 170, the angles between the y-axis and the oscillation planes of the third crystal backward o-light and the third crystal backward e-light are −45° and 45° respectively. After rotating 45° by the second Faraday rotator 140, the angles between the y-axis and the oscillation planes of the third crystal backward o-light and the third crystal backward e-light are φro2=(−45°)+45°=0° and φre2=45°+45°=90° respectively. Therefore, the oscillation plane of the third crystal backward o-light is parallel to the y-axis, and the oscillation plane of the third crystal backward e-light is parallel to the x-axis. When entering the second birefringent crystal 130, the backward light undergoes a conversion between the o-light and e-light relative to the forward light, and the third crystal backward o-light propagates in the second birefringent crystal 130 in the e-light polarization state. After exiting the second birefringent crystal 130, the angles between the optical axis of first half-wave plate 160 and the oscillation planes of the third crystal backward o-light and the third crystal backward e-light are βro1=22.5° and βre1=−67.5° respectively. After rotating by (2*βro1=45°) and (2*βre1=−135°) through the first half-wave plate 160, the angles between the y-axis and the oscillation planes of the third crystal backward o-light and the third crystal backward e-light are 45° and −45° respectively. After rotating 45° by the first Faraday rotator 120, the angles between the y-axis and the oscillation planes of the third crystal backward o-light and the third crystal backward e-light are φro1=45°+45°=90° and φre1=−45°+45°=0° respectively. Therefore, the oscillation plane of the third crystal backward o-light is parallel to the x-axis, and the oscillation plane of the third crystal backward e-light is parallel to the y-axis, and the third crystal backward o-light still propagates in the first birefringent crystal 110 in the o-light polarization state.

Figure 11A:
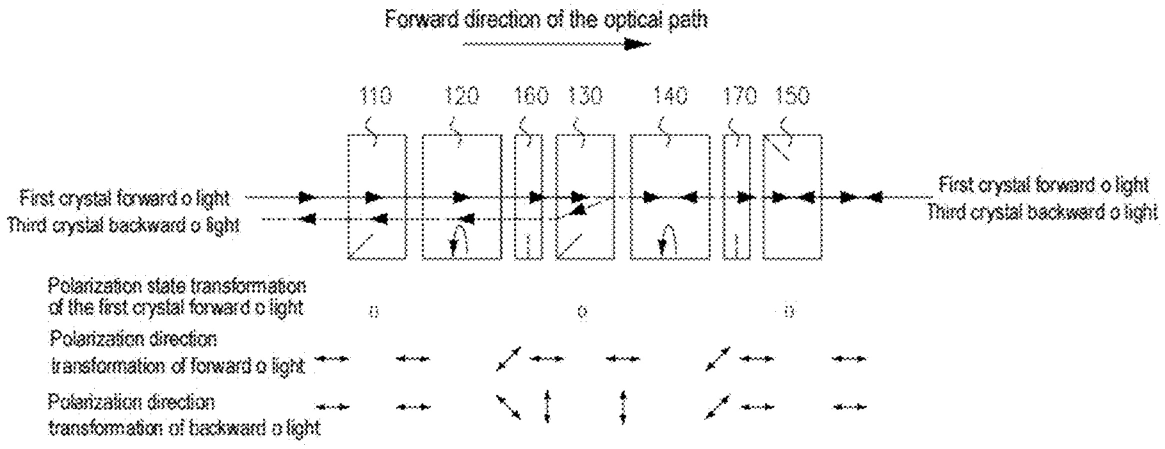
FIG. 11*a* is a schematic diagram of optical paths and polarization state transformation of first crystal forward o light and third crystal backward o light according to the second embodiment of the present disclosure.
Figure 11B:
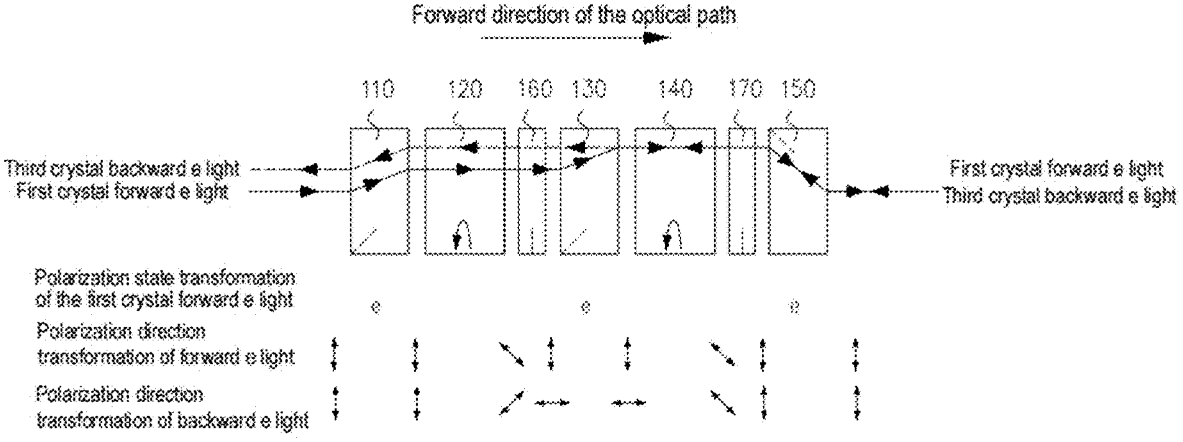
FIG. 11*b* is a schematic diagram of optical paths and polarization state transformation of first crystal forward e light and third crystal backward e light according to the second embodiment of the present disclosure.
Figure 12A:
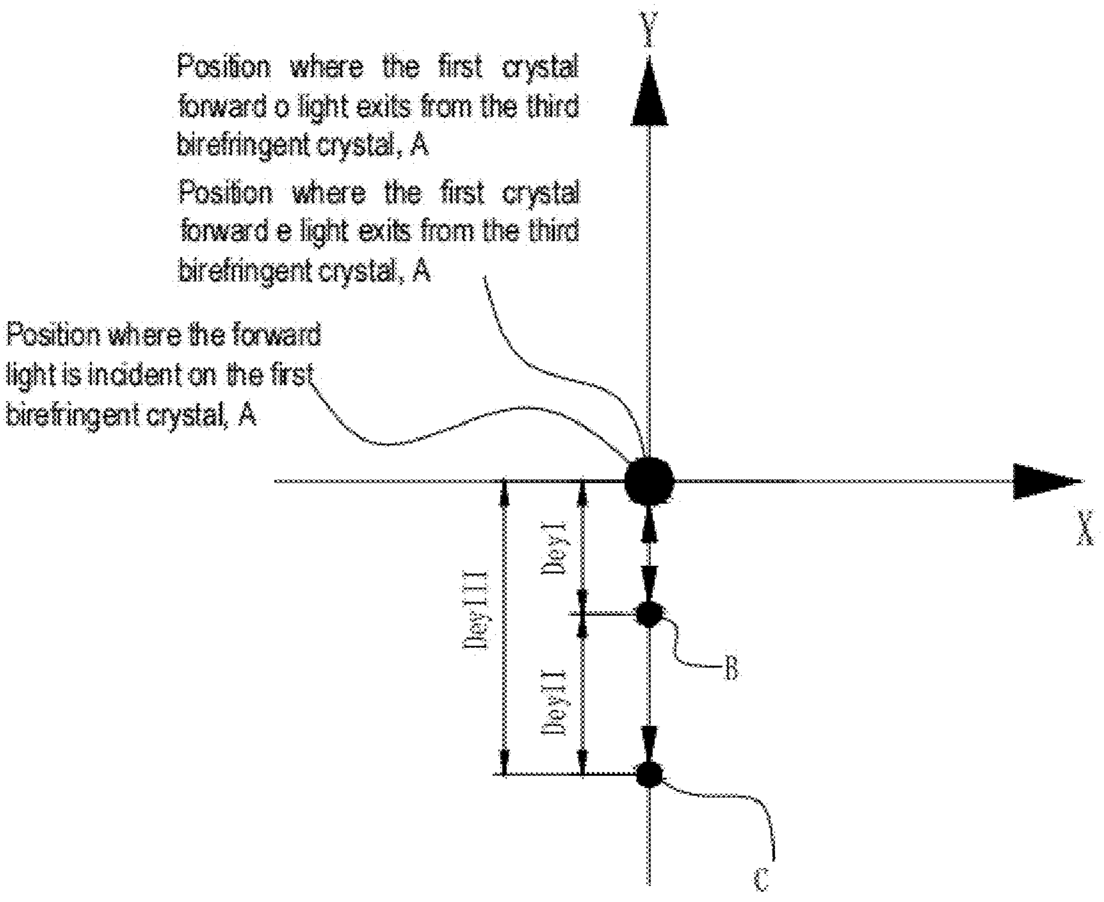
FIG. 12*a* is a schematic diagram of a displacement of the first crystal forward o-light and the first crystal forward e-light in the optical isolator core according to the second embodiment of the present disclosure.

Refer to FIGS. 11*a* and 11*b* for the forward optical path; the first crystal forward o-light propagates in the o-light polarization state in the first birefringent crystal 110, the second birefringent crystal 130, and the third birefringent crystal 150, there is no displacement; the first crystal forward e-light propagates in the e-light polarization state in the first birefringent crystal 110, the second birefringent crystal 130, and the third birefringent crystal 150, there is displacement. The specific displacement is shown in FIG. 12*a*. The forward light is incident on the first birefringent crystal 110 at point A (0,0). The first crystal forward o-light does not experience any displacement and ultimately exits the third birefringent crystal 150 at the same point A (0,0). The first crystal forward e-light is displaced along the x-axis by DexI=0 and along the y-axis by DeyI=−a in the first birefringent crystal 110, exits the first birefringent crystal 110 and enters the second birefringent crystal 130 at point B (0,−a). It is displaced along the x-axis by DexII=0 and along the y-axis by DeyII=−b in the second birefringent crystal 130, exits the second birefringent crystal 130 and enters the third birefringent crystal 150 at point C (0,−a−b). It is displaced along the x-axis by DexIII=0 and along the y-axis by DeyIII=a+b in the third birefringent crystal 150, and ultimately also exits from the third birefringent crystal 150 at point A (0,0), thus merge the first crystal forward o-light and the first crystal forward e-light into one beam for output.

Figure 12B:
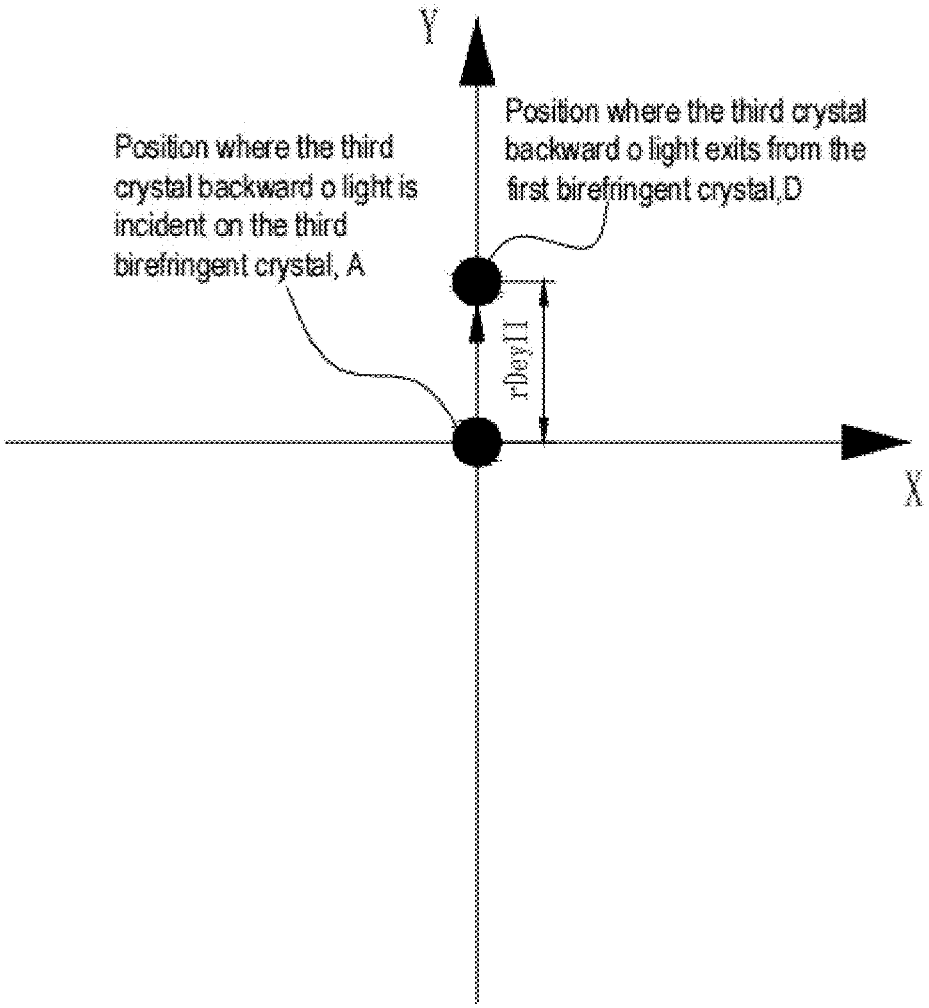
FIG. 12*b* is a schematic diagram of a displacement of the third crystal backward o-light in the optical isolator core according to the second embodiment of the present disclosure.

For the third crystal backward o-light, as shown in the aforementioned calculations of the rotation angle and FIG. 11*a*, the third crystal backward o-light propagates in the o-light polarization state in the third birefringent crystal 150 without any displacement of the optical path. After passing through the second half-wave plate 170 and the second Faraday rotator 140, the polarization state of the third crystal backward o-light propagates in the e-light polarization state in the second birefringent crystal 130, the third crystal backward o-light undergoes a polarization state conversion and a displacement of optical path relative to the first crystal forward o-light. The polarization state of the third crystal backward o-light then successively passes through the first half-wave plate 160 and the first Faraday rotator 120, and propagates in the o-light polarization state in the first birefringent crystal 110 without any displacement of the optical path. The specific displacement is shown in FIG. 12*b*, the third crystal backward o-light is incident at point A (0,0) on the third birefringent crystal 150, only experiences a displacement along the x-axis rDexII=0 and along the y-axis rDeyII=b in the second birefringent crystal 130, and finally exits the first birefringent crystal 110 at point D (0,b).

Figure 12C:
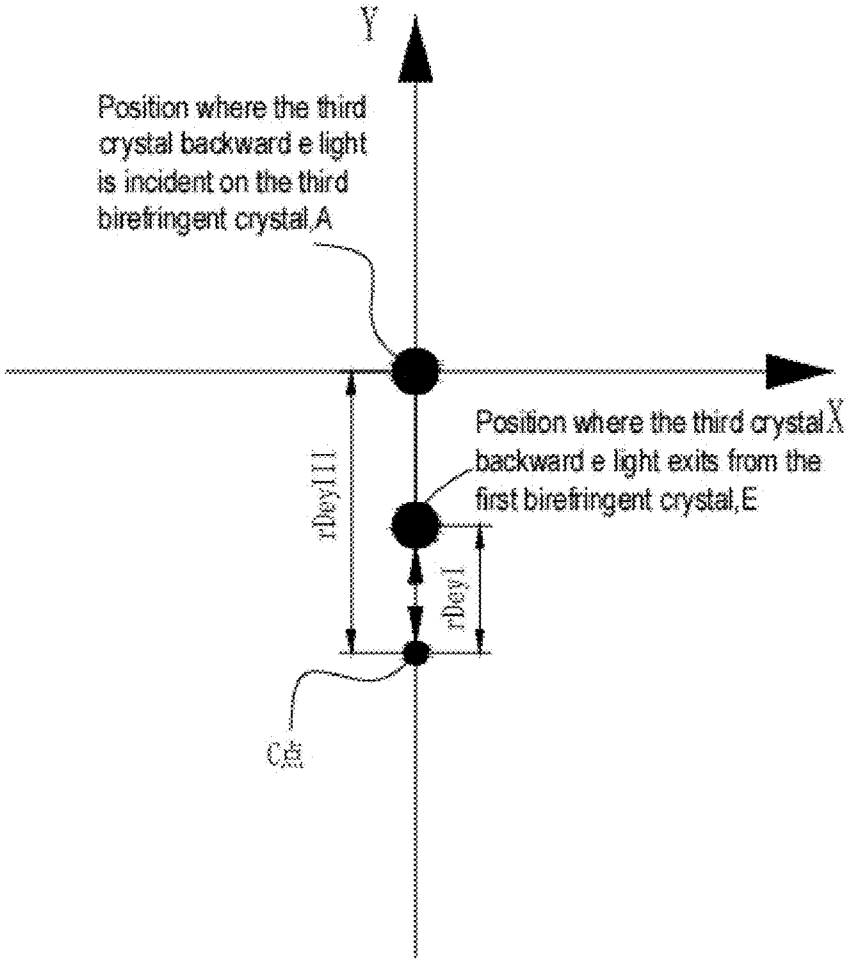
FIG. 12*c* is a schematic diagram of a displacement of the third crystal backward e-light in the optical isolator core according to the second embodiment of the present disclosure.

Conversely, for the third crystal backward e-light, as shown in the aforementioned calculations of the rotation angle and FIG. 11*b*, the third crystal backward e-light propagates in the e-light polarization state in the third birefringent crystal 150 and the first birefringent crystal 110, with displacement of the optical path, and propagates in the o-light polarization state in the second birefringent crystal 130 without any displacement of the optical path. The specific displacement is shown in FIG. 12*c*, the third crystal backward e-light is incident on the third birefringent crystal 150 at point A (0,0), experiences a displacement along the x-axis rDexIII=0 and along the y-axis rDeyIII=−a−b in the third birefringent crystal 150, exits and enters the second birefringent crystal 130 at point C (0,−a−b). There is no displacement of the optical path in the second birefringent crystal 130, and it still exits and enters the first birefringent crystal 110 at point C (0,−a−b). It experiences a displacement along the x-axis rDexI=0 and along the y-axis rDeyI=a in the first birefringent crystal 110, and finally exits on the first birefringent crystal 110 at point E (0,−b).

In summary, both the first crystal forward o-light and the first crystal forward e-light are incident on the first birefringent crystal 110 at point A (0,0), and ultimately also exits from the third birefringent crystal 150 at the same point A (0,0), achieving normal output of the forward light. Both the third crystal backward o-light and the third crystal backward e-light are incident on the third birefringent crystal 150 at point A (0,0), and ultimately the third crystal backward o-light exits from the first birefringent crystal 110 at point D (0,b), while the third crystal backward e-light exits from the first birefringent crystal 110 at point E (0,−b). Both deviate from the forward light incidence point A (0,0), achieving the dual-stage isolation function of the backward light.

It should also be noted that the above second embodiment is merely illustrative, and the description of the displacement of the optical path, the direction of displacement, and the distance of displacement does not constitute a limitation of the embodiments of the present disclosure. Based on the structure proposed in the embodiments of the present disclosure, by reasonably designing the rotation direction of the Faraday rotators, the φ angles of optical axis of the half-wave plates, and the relative position of the Faraday rotators and half-wave plates in the rotation assembly, different combinations of Faraday rotators and half-wave plates can achieve the same rotation angle. After passing through the rotation assembly composed of Faraday rotators and half-wave plates, the polarization states in the two adjacent crystals before and after the rotation assembly will keep the same polarization type with rotation angles of 0° and 180°, and will undergo an o-light to e-light conversion with rotation angles of 90° and −90°. By reasonably designing the rotation direction of the Faraday rotators, the φ angles of optical axis of the half-wave plates, and the relative position of the Faraday rotators and half-wave plates, different relationships of o-light and e-light polarization states can be achieved in the first birefringent crystal 110, the second birefringent crystal 130, and the third birefringent crystal 150, such as: o-o-o, o-o-e, o-e-o, o-e-e. Then, based on the reasonable design of the o angles of optical axis of the first birefringent crystal 110, the second birefringent crystal 130, and the third birefringent crystal 150, and the relative displacement amounts of o-light and e-light, it is possible to achieve the coupling and normal output of forward o-light and forward e-light, and the isolation of backward o-light and backward e-light, all these schemes should be included in the scope of protection of the embodiments of the present disclosure.

In the optical isolator core 100 provided by this embodiment, by setting the first Faraday rotator 120 and the first half-wave plate 160 between the first birefringent crystal 110 and the second birefringent crystal 130, and the second Faraday rotator 140 and the second half-wave plate 170 between the second birefringent crystal 130 and the third birefringent crystal 150, it is possible to adjust the polarization state of the light through the first Faraday rotator 120 and the first half-wave plate 160, and/or the second Faraday rotator 140 and the second half-wave plate 170. By setting the principal sections of the first birefringent crystal 110, the second birefringent crystal 130, and the third birefringent crystal 150 in parallel to each other (with φ angles differing by 0° or 180°), and the combination of Faraday rotators and half-wave plates to achieve different rotation angles of the polarization state of the light, the product design can maintain the same polarization type of the linearly polarized light between adjacent two birefringent crystals as o-o, e-e, or convert them as o-e, e-o. For example, when the linearly polarized light undergoes a polarization state rotation of 0° or 180° by the Faraday rotator and half-wave plate, it propagates as o-light or e-light in both adjacent birefringent crystals, achieving o-o, e-e maintenance; when the linearly polarized light undergoes a polarization state rotation of −90° or 90° by the Faraday rotator and half-wave plate, it propagates as different polarization type in the two adjacent birefringent crystals, achieving o-e, e-o conversion. Moreover, both Faraday rotators and half-wave plates are in parallel plate structure, which is simple in structure and low in production cost.

In an optional embodiment, the first birefringent crystal 110, and/or the second birefringent crystal 130, and/or the third birefringent crystal 150 is a combined crystal. The combined crystal does not only achieves the same displacement for o-light and e-light but also is used to compensate for the optical path difference.

Specifically, taking the first birefringent crystal 110 as an example of a combined crystal, the first birefringent crystal 110 comprises two sub-birefringent crystals. The sum of relative displacements of the forward o-light and the forward e-light in the two sub-birefringent crystals achieves the same relative displacement in the first birefringent crystal 110. The combined crystal can be used to compensate for the optical path difference in a single birefringent crystal or to compensate for the optical path differences across multiple birefringent crystals in the entire optical path. When compensating for a single crystal, it can be configured with the o-light and e-light polarization states interchanged in two sub-birefringent crystals that are either both positive-birefringent crystal or both negative-birefringent crystals, thereby reduce the total optical path difference. Alternatively, the two sub-birefringent crystals can consist of one positive-birefringent crystal and one negative-birefringent crystal with the same polarization state (either o-light or e-light) maintained in both, thus reduce the optical path difference. The optical path difference of o-light and e-light in each sub-birefringent crystal can be changed by properly setting the θ angle and the thickness of the sub-birefringent crystals. When compensating for the optical path difference of the entire optical path, in addition to achieving the same displacement, the sub-birefringent crystal for the compensation of the optical path difference in the combined crystal must also have its optical path difference between o-light and e-light configured in the opposite direction to the sum of the optical path differences of the other birefringent crystals in the entire optical path. This reduces the total optical path difference and can even make the optical path difference zero, achieving the function of compensating for the optical path difference of the entire optical path.

Figure 13:
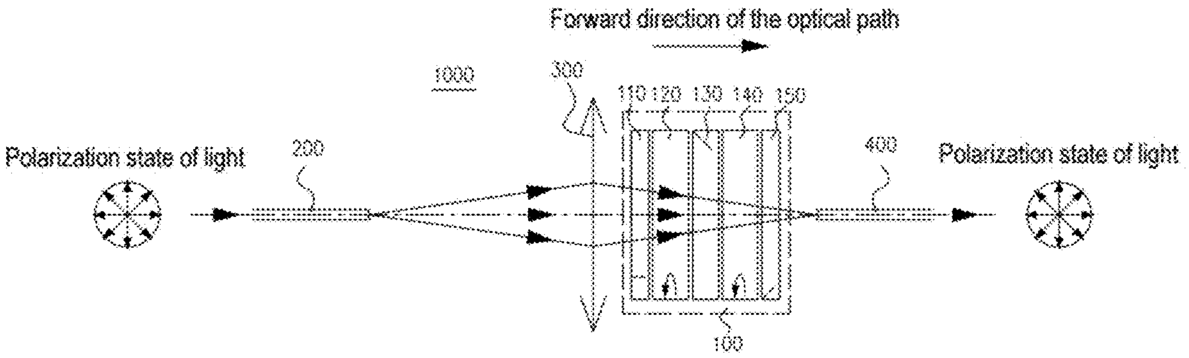
FIG. 13 is a schematic structural and optical path diagram of an optical isolator according to an embodiment of the present disclosure.

According to another aspect of the embodiments of the present disclosure, an optical isolator is also provided. Refer to FIG. 13 For details which illustrates the structure and optical path of the optical isolator. As shown in the figure, the optical isolator 1000 includes an input waveguide 200, a lens 300, an optical isolator core 100 as provided in any of the aforementioned embodiments, and an output waveguide 400 successively arranged along the forward direction of the optical path. The input waveguide 200 is used to import divergent beam along the forward direction of the optical path and output it to the lens 300. The lens 300 is used to convert the divergent beam into converging beam and output it to the first birefringent crystal 110 in the optical isolator core 100. The third birefringent crystal 150 in the optical isolator core 100 is used to output the recombined beam of the first crystal forward o-light and the first crystal forward e-light to the output waveguide 400. The output waveguide 400 is used to export the recombined beam.

Figure 14:
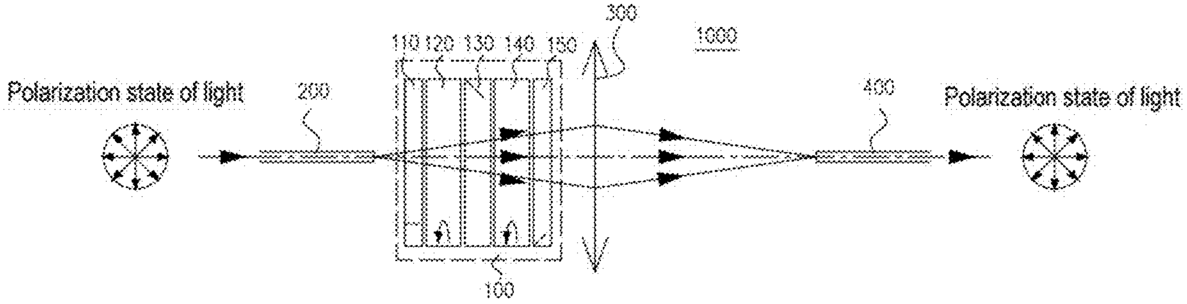
FIG. 14 is a schematic structural and optical path diagram of another optical isolator according to an embodiment of the present disclosure.

According to another aspect of the embodiments of the present disclosure, another optical isolator is also provided. Refer to FIG. 14 for details which illustrates the structure and optical path of the optical isolator. As shown in the figure, the optical isolator 1000 includes an input waveguide 200, an optical isolator core 100 as provided in any of the aforementioned embodiments, a lens 300, and an output waveguide 400 successively arranged along the forward direction of the optical path. The input waveguide 200 is used to import divergent beam along the forward direction of the optical path and output it to the first birefringent crystal 110. The third birefringent crystal 150 in the optical isolator core 100 is used to output the recombined beam of the first crystal forward o-light and the first crystal forward e-light to the lens 300. The lens 300 is used to convert the recombined divergent light into converging light and output it to the output waveguide 400. The output waveguide 400 is used to export the converging light.

Finally, it should be noted that the above embodiments are only used to illustrate the technical solution of the embodiments of the present disclosure and do not limit it. Although the embodiments of the present disclosure has been described in detail with reference to the aforementioned embodiments, those skilled in the art should understand that they can still modify the technical solutions recorded in the aforementioned embodiments or equivalently replace some or all of the technical features; such modifications or replacements do not deviate the essence of the corresponding technical solutions from the scope of the technical solutions of the embodiments of the present disclosure examples. In particular, as long as there is no structural conflict, the technical features mentioned in each embodiment can be combined in any way.

What is claimed is:

1. An optical isolator core, comprising: a first birefringent crystal, a first Faraday rotator, a second birefringent crystal, a second Faraday rotator, and a third birefringent crystal that are successively arranged along the forward optical path; the first birefringent crystal, the first Faraday rotator, the second birefringent crystal, the second Faraday rotator and the third birefringent crystal are all parallel plate structures;

wherein in the case that forward light is incident on the first birefringent crystal, the first birefringent crystal is configured to separate the forward light into first crystal forward o light and first crystal forward e light whose polarization directions are perpendicular to each other, and then output them to the first Faraday rotator; the first crystal forward o light generates a first displacement of the first crystal forward o light and the first crystal forward e light generates a first displacement of the first crystal forward e light respectively;

the first Faraday rotator is configured to rotate the polarization direction of the first crystal forward o-light and the first crystal forward e-light by an angle of $\alpha1$ in the first rotation direction, and then output them to the second birefringent crystal, where $\alpha1=45°$;

the second birefringent crystal is configured to cause the first crystal forward o-light to generate a second displacement of the first crystal forward o-light, and the first crystal forward e-light to generate a second displacement of the first crystal forward e-light, and then output them to the second Faraday rotator;

the second Faraday rotator is configured to rotate the polarization direction of the first crystal forward o-light and the first crystal forward e-light by an angle of α2 in the second rotation direction, and then output them to the third birefringent crystal, where α2=45°;

the third birefringent crystal is configured to cause the first crystal forward o-light to generate a third displacement of the first crystal forward o-light, and the first crystal forward e-light to generate a third displacement of the first crystal forward e-light;

wherein a sum of the first displacement of the first crystal forward o light, the second displacement of the first crystal forward o light, and the third displacement of the first crystal forward o light is equal to a sum of the first displacement of the first crystal forward e light, the second displacement of the first crystal forward e light, and the third displacement of the first crystal forward e light, and the first crystal forward o light and the first crystal forward e light are coincident with each other in response to exiting from the third birefringent crystal;

wherein in the case that backward light entering backward along the forward optical path is incident on the third birefringent crystal, the third birefringent crystal is configured to separate the backward light into a third crystal backward o light and a third crystal backward e light whose polarization directions are perpendicular to each other, and then output them to the second Faraday rotator, such that the third crystal backward o light and the third crystal backward e light respectively generate a third displacement of the third crystal backward o light and a third displacement of the third crystal backward e light;

the second Faraday rotator is configured to rotate the polarization directions of the third crystal backward o light and the third crystal backward e light by an angle of α2 in the second rotation direction, and then output them to the second birefringent crystal;

the second birefringent crystal is configured to cause the third crystal backward o light to generate a second displacement of the third crystal backward o light, and the third crystal backward e light to generate a second displacement of the third crystal backward e light, and then output them to the first Faraday rotator;

the first Faraday rotator is configured to rotate the polarization directions of the third crystal backward o light and the third crystal backward e light by an angle of α1 in the first rotation direction, and then output them to the first birefringent crystal;

the first birefringent crystal is configured to cause the third crystal backward o light to generate a first displacement of the third crystal backward o light, and the third crystal backward e light to generate a first displacement of the third crystal backward e light;

wherein a sum of the first displacement of the third crystal backward o light, the second displacement of the third crystal backward o light, and the third displacement of the third crystal backward o light causes the third crystal backward o light to deviate from the forward optical path, and a sum of the first displacement of the third crystal backward e light, the second displacement of the third crystal backward e light, and the third displacement of the third crystal backward e light causes the third crystal backward e light to deviate from the forward optical path.

2. The optical isolator core according to claim 1, wherein an xyz coordinate system is established with the forward direction of the optical path as the z-axis direction;

the e-light oscillation plane through the optical axis of the first birefringent crystal intersects with the xy plane at the first straight line, and the angle between the first straight line and the y-axis is φ1; The e-light oscillation plane through the optical axis of the second birefringent crystal intersects with the xy plane at the second straight line, and the angle between the second straight line and the y-axis is φ2; the e-light oscillation plane through the optical axis of the third birefringent crystal intersects with the xy plane at the third straight line, and the angle between the third straight line and the y-axis is φ3; wherein $0° \leq \varphi 1 \leq 360°$, $|\varphi 2-\varphi 1|=(m \cdot 90°+\alpha 1)$, $0 \leq m \leq 3$, m is an integer, $|\varphi 3-\varphi 1|=(n \cdot 90°)$, n=1 or 3.

3. The optical isolator core according to claim 1, wherein, the angle between the normal of an incident surface of the forward light and the optical axis of the first birefringent crystal, the second birefringent crystal and the third birefringent crystal is the walk-off angle θ1, θ2, and θ3 respectively, wherein $0°<\theta 1<90°$ or $-90°<\theta 1<0°$, $0°<\theta 2<90°$ or $-90°<\theta 2<0°$, $0°<\theta 3<90°$ or $-90°<\theta 3<0°$, the walk-off angle is configured to control a relative walk-off between an exiting o light and an exiting e light in response to the light traveling through the corresponding birefringent crystal.

4. The optical isolator core according to claim 1, wherein the polarization direction of the first crystal forward o-light aligns with the o-light polarization state or e-light polarization state of the second birefringent crystal after passing through the first Faraday rotator.

5. The optical isolator core according to claim 1, wherein the polarization state of the first crystal forward o-light aligns with the o-light polarization state or e-light polarization state of the third birefringent crystal after passing through the second Faraday rotator.

6. The optical isolator core according to claim 1, wherein the optical isolator core further includes a first half-wave plate set between the first birefringent crystal and the second birefringent crystal and a second half-wave plate set between the second birefringent crystal and the third birefringent crystal, the first half-wave plate and the second half-wave plate are both parallel plate structures;

the first half-wave plate is configured to rotate the polarization direction of the first crystal forward o-light and the first crystal forward e-light by (2*βo1) and (2*βe1) respectively, wherein βo1 is the angle between the projection of the first crystal forward o-light on the incidence surface of the first half-wave plate and the optical axis of the first half-wave plate, βe1 is the angle between the projection of the first crystal forward e-light on the incidence surface of the first half-wave plate and the optical axis of the first half-wave plate, $|\beta o1-\beta Be1|=90°$, and $\beta o1=\pm 22.5°$ or $\pm 67.5°$;

the first half-wave plate is also configured to rotate the polarization direction of the third crystal backward o-light and the third crystal backward e-light by (2*βro1) and (2*βre1) respectively, wherein βro1 is the angle between the projection of the third crystal backward o-light on the incidence surface of the first half-wave plate and the optical axis of the first half-wave plate, βre1 is the angle between the projection of the third crystal backward e-light on the incidence surface of the first half-wave plate and the optical axis of the first half-wave plate, $|\beta ro1-\beta re1|=90°$, and $\beta ro1=\pm 22.5°$ or $\pm 67.5°$;

the second half-wave plate is configured to rotate the polarization direction of the first crystal forward o-light and the first crystal forward e-light by (2*βo2) and (2*βe2) respectively, wherein βo2 is the angle between the projection of the first crystal forward o-light on the forward light incidence surface of the second half-wave plate and the optical axis of the second half-wave plate, βe2 is the angle between the projection of the first crystal forward e-light on the forward light incidence surface of the second half-wave plate and the optical axis of the second half-wave plate, |βo2−βe2|=90°, and βo2=±22.5° or ±67.5°;

the second half-wave plate is also configured to rotate the polarization direction of the third crystal backward o-light and the third crystal backward e-light by (2*βro2) and (2*βre2) respectively, wherein βro2 is the angle between the projection of the third crystal backward o-light on the incidence surface of the second half-wave plate and the optical axis of the second half-wave plate, βre2 is the angle between the projection of the third crystal backward e-light on the incidence surface of the second half-wave plate and the optical axis of the second half-wave plate, |βro2−βre2|=90°, and βro2=±22.5° or ±67.5°.

7. The optical isolator core according to claim 6, wherein an xyz coordinate system is established with the forward direction of the optical path as the z-axis;

the e-light oscillation plane through the optical axis of the first birefringent crystal intersects with the xy plane at the first straight line, and the angle between the first straight line and the y-axis is φ1; the e-light oscillation plane through the optical axis of the second birefringent crystal intersects with the xy plane at the second straight line, and the angle between the second straight line and the y-axis is φ2; the e-light oscillation plane through the optical axis of the third birefringent crystal intersects with the xy plane at the third straight line, and the angle between the third straight line and the y-axis is φ3; wherein 0°≤φ1≤360°, |φ2−φ1|=0° or 180°, and |φ3−φ1|=0° or 180°.

8. The optical isolator core according to claim 7, wherein the projection of the optical axis of the first half-wave plate on the xy plane is the fourth straight line, and the angle between the fourth straight line and the y-axis is φ4; the projection of the optical axis of the second half-wave plate on the xy plane is the fifth straight line, and the angle between the fifth straight line and the y-axis is φ5; wherein |φ4−φ1|=22.5°, 67.5°, 112.5°, or 157.5°, and |φ5−φ2|=22.5°, 67.5°, 112.5°, or 157.5°.

9. The optical isolator core according to claim 1, wherein the first birefringent crystal, and/or the second birefringent crystal, and/or the third birefringent crystal is a combined crystal, the combined crystal does not only achieve the same displacement of o-light and e-light but also compensate for the optical path difference.

10. An optical isolator, comprising: an input waveguide, a lens, an optical isolator core, and an output waveguide that are successively arranged along the forward direction of the optical path; wherein, the optical isolator core comprises: a first birefringent crystal, a first Faraday rotator, a second birefringent crystal, a second Faraday rotator, and a third birefringent crystal that are successively arranged along the forward optical path; the first birefringent crystal, the first Faraday rotator, the second birefringent crystal, the second Faraday rotator and the third birefringent crystal are all parallel plate structures;

the input waveguide is configured to import divergent beam along the forward direction of the optical path and output it to the lens, the lens is configured to convert the divergent beam into convergent beam and output it to the first birefringent crystal in the optical isolator core;

wherein in the case that forward light is incident on the first birefringent crystal, the first birefringent crystal is configured to separate the forward light into first crystal forward o light and first crystal forward e light whose polarization directions are perpendicular to each other, and then output them to the first Faraday rotator; the first crystal forward o light generates a first displacement of the first crystal forward o light and the first crystal forward e light generates a first displacement of the first crystal forward e light respectively;

the first Faraday rotator is configured to rotate the polarization direction of the first crystal forward o-light and the first crystal forward e-light by an angle of α1 in the first rotation direction, and then output them to the second birefringent crystal, where α1=45°;

the second birefringent crystal is configured to cause the first crystal forward o-light to generate a second displacement of the first crystal forward o-light, and the first crystal forward e-light to generate a second displacement of the first crystal forward e-light, and then output them to the second Faraday rotator;

the second Faraday rotator is configured to rotate the polarization direction of the first crystal forward o-light and the first crystal forward e-light by an angle of α2 in the second rotation direction, and then output them to the third birefringent crystal, where α2=45°;

the third birefringent crystal is configured to cause the first crystal forward o-light to generate a third displacement of the first crystal forward o-light, and the first crystal forward e-light to generate a third displacement of the first crystal forward e-light;

wherein a sum of the first displacement of the first crystal forward o light, the second displacement of the first crystal forward o light, and the third displacement of the first crystal forward o light is equal to a sum of the first displacement of the first crystal forward e light, the second displacement of the first crystal forward e light, and the third displacement of the first crystal forward e light, and the first crystal forward o light and the first crystal forward e light are coincident with each other in response to exiting from the third birefringent crystal;

and the third birefringent crystal in the optical isolator core is configured to output the recombined beam of the first crystal forward o-light and the first crystal forward e-light to the output waveguide, and the output waveguide is configured to export the recombined beam;

wherein in the case that backward light entering backward along the forward optical path is incident on the third birefringent crystal, the third birefringent crystal is configured to separate the backward light into a third crystal backward o light and a third crystal backward e light whose polarization directions are perpendicular to each other, and then output them to the second Faraday rotator, such that the third crystal backward o light and the third crystal backward e light respectively generate a third displacement of the third crystal backward o light and a third displacement of the third crystal backward e light;

the second Faraday rotator is configured to rotate the polarization directions of the third crystal backward o light and the third crystal backward e light by an angle of α2 in the second rotation direction, and then output them to the second birefringent crystal;

the second birefringent crystal is configured to cause the third crystal backward o light to generate a second displacement of the third crystal backward o light, and the third crystal backward e light to generate a second displacement of the third crystal backward e light, and then output them to the first Faraday rotator;

the first Faraday rotator is configured to rotate the polarization directions of the third crystal backward o light and the third crystal backward e light by an angle of $\alpha 1$ in the first rotation direction, and then output them to the first birefringent crystal;

the first birefringent crystal is configured to cause the third crystal backward o light to generate a first displacement of the third crystal backward o light, and the third crystal backward e light to generate a first displacement of the third crystal backward e light;

wherein a sum of the first displacement of the third crystal backward o light, the second displacement of the third crystal backward o light, and the third displacement of the third crystal backward o light causes the third crystal backward o light to deviate from the forward optical path, and a sum of the first displacement of the third crystal backward e light, the second displacement of the third crystal backward e light, and the third displacement of the third crystal backward e light causes the third crystal backward e light to deviate from the forward optical path, to prevent backward light from coupling into the input waveguide after passing through the lens.

11. The optical isolator according to claim 10, wherein an xyz coordinate system is established with the forward direction of the optical path in the first birefringent crystal as the z-axis direction;

the e-light oscillation plane through the optical axis of the first birefringent crystal intersects with the xy plane at the first straight line, and the angle between the first straight line and the y-axis is $\varphi 1$; the e-light oscillation plane through the optical axis of the second birefringent crystal intersects with the xy plane at the second straight line, and the angle between the second straight line and the y-axis is $\varphi 2$; the e-light oscillation plane through the optical axis of the third birefringent crystal intersects with the xy plane at the third straight line, and the angle between the third straight line and the y-axis is $\varphi 3$; wherein $0° \leq \varphi 1 \leq 360°$, $|\varphi 2-\varphi 1|=(m \cdot 90°+\alpha 1)$, $0 \leq m \leq 3$, m is an integer, $|\varphi 3-\varphi 1|=(n \cdot 90°)$, n=1 or 3.

12. The optical isolator according to claim 10, wherein, the angle between the normal of an incident surface of the forward light and the optical axis of the first birefringent crystal, the second birefringent crystal and the third birefringent crystal is the walk-off angle $\theta 1$, $\theta 2$, and $\theta 3$ respectively, wherein $0°<\theta 1<90°$ or $-90°<\theta 1<0°$, $0°<\theta 2<90°$ or $-90°<\theta 2<0°$, $0°<\theta 3<90°$ or $-90°<\theta 3<0°$, the walk-off angle is configured to control a relative walk-off between an exiting o light and an exiting e light in response to the light traveling through the corresponding birefringent crystal.

13. The optical isolator according to claim 10, wherein the polarization direction of the first crystal forward o-light aligns with the o-light polarization state or e-light polarization state of the second birefringent crystal after passing through the first Faraday rotator.

14. The optical isolator according to claim 10, wherein the polarization state of the first crystal forward o-light aligns with the o-light polarization state or e-light polarization state of the third birefringent crystal after passing through the second Faraday rotator.

15. The optical isolator according to claim 10, wherein the optical isolator core further includes a first half-wave plate set between the first birefringent crystal and the second birefringent crystal and a second half-wave plate set between the second birefringent crystal and the third birefringent crystal, the first half-wave plate and the second half-wave plate are both parallel plate structures;

the first half-wave plate is configured to rotate the polarization direction of the first crystal forward o-light and the first crystal forward e-light by ($2^*\beta o1$) and ($2^*\beta e1$) respectively, wherein $\beta o1$ is the angle between the projection of the first crystal forward o-light on the incidence surface of the first half-wave plate and the optical axis of the first half-wave plate, $\beta e1$ is the angle between the projection of the first crystal forward e-light on the incidence surface of the first half-wave plate and the optical axis of the first half-wave plate, $|\beta o1-\beta e1|=90°$, and $\beta o1=\pm 22.5°$ or $\pm 67.5°$;

the first half-wave plate is also configured to rotate the polarization direction of the third crystal backward o-light and the third crystal backward e-light by ($2^*\beta ro1$) and ($2^*\beta re1$) respectively, wherein $\beta ro1$ is the angle between the projection of the third crystal backward o-light on the incidence surface of the first half-wave plate and the optical axis of the first half-wave plate, $\beta re1$ is the angle between the projection of the third crystal backward e-light on the incidence surface of the first half-wave plate and the optical axis of the first half-wave plate, $|\beta ro1-\beta re1|=90°$, and $\beta ro1=\pm 22.5°$ or $\pm 67.5°$;

the second half-wave plate is configured to rotate the polarization direction of the first crystal forward o-light and the first crystal forward e-light by ($2^*\beta o2$) and ($2^*\beta e2$) respectively, wherein $\beta o2$ is the angle between the projection of the first crystal forward o-light on the forward light incidence surface of the second half-wave plate and the optical axis of the second half-wave plate, $\beta e2$ is the angle between the projection of the first crystal forward e-light on the forward light incidence surface of the second half-wave plate and the optical axis of the second half-wave plate, $[\beta o2-\beta e2]=90°$, and $\beta o2=\pm 22.5°$ or $\pm 67.5°$;

the second half-wave plate is also configured to rotate the polarization direction of the third crystal backward o-light and the third crystal backward e-light by ($2^*\beta ro2$) and ($2^*\beta re2$) respectively, wherein $\beta ro2$ is the angle between the projection of the third crystal backward o-light on the incidence surface of the second half-wave plate and the optical axis of the second half-wave plate, $\beta re2$ is the angle between the projection of the third crystal backward e-light on the incidence surface of the second half-wave plate and the optical axis of the second half-wave plate, $|\beta ro2-\beta re2|=90°$, and $\beta ro2=\pm 22.5°$ or $\pm 67.5°$.

16. An optical isolator, comprising: an input waveguide, an optical isolator core, a lens, and an output waveguide that are successively arranged along the forward direction of the optical path;

the optical isolator core comprises: a first birefringent crystal, a first Faraday rotator, a second birefringent crystal, a second Faraday rotator, and a third birefringent crystal that are successively arranged along the forward optical path; the first birefringent crystal, the first Faraday rotator, the second birefringent crystal, the second Faraday rotator and the third birefringent crystal are all parallel plate structures;

the input waveguide is configured to import divergent beam along the forward direction of the optical path and output it to the first birefringent crystal;

wherein in the case that forward light is incident on the first birefringent crystal, the first birefringent crystal is configured to separate the forward light into first crystal forward o light and first crystal forward e light whose polarization directions are perpendicular to each other, and then output them to the first Faraday rotator; the first crystal forward o light generates a first displacement of the first crystal forward o light and the first crystal forward e light generates a first displacement of the first crystal forward e light respectively;

the first Faraday rotator is configured to rotate the polarization direction of the first crystal forward o-light and the first crystal forward e-light by an angle of $\alpha 1$ in the first rotation direction, and then output them to the second birefringent crystal, where $\alpha 1=45°$;

the second birefringent crystal is configured to cause the first crystal forward o-light to generate a second displacement of the first crystal forward o-light, and the first crystal forward e-light to generate a second displacement of the first crystal forward e-light, and then output them to the second Faraday rotator;

the second Faraday rotator is configured to rotate the polarization direction of the first crystal forward o-light and the first crystal forward e-light by an angle of $\alpha 2$ in the second rotation direction, and then output them to the third birefringent crystal, where $\alpha 2=45°$;

the third birefringent crystal is configured to cause the first crystal forward o-light to generate a third displacement of the first crystal forward o-light, and the first crystal forward e-light to generate a third displacement of the first crystal forward e-light;

wherein a sum of the first displacement of the first crystal forward o light, the second displacement of the first crystal forward o light, and the third displacement of the first crystal forward o light is equal to a sum of the first displacement of the first crystal forward e light, the second displacement of the first crystal forward e light, and the third displacement of the first crystal forward e light, and the first crystal forward o light and the first crystal forward e light are coincident with each other in response to exiting from the third birefringent crystal;

the third birefringent crystal in the optical isolator core is configured to output the recombined beam of the first crystal forward o-light and the first crystal forward e-light to the lens, the lens is configured to convert the recombined divergent beam into convergent beam and output it to the output waveguide, and the output waveguide is configured to export the convergent beam;

wherein in the case that backward light entering backward along the forward optical path is incident on the third birefringent crystal, the third birefringent crystal is configured to separate the backward light into a third crystal backward o light and a third crystal backward e light whose polarization directions are perpendicular to each other, and then output them to the second Faraday rotator, such that the third crystal backward o light and the third crystal backward e light respectively generate a third displacement of the third crystal backward o light and a third displacement of the third crystal backward e light;

the second Faraday rotator is configured to rotate the polarization directions of the third crystal backward o light and the third crystal backward e light by an angle of $\alpha 2$ in the second rotation direction, and then output them to the second birefringent crystal;

the second birefringent crystal is configured to cause the third crystal backward o light to generate a second displacement of the third crystal backward o light, and the third crystal backward e light to generate a second displacement of the third crystal backward e light, and then output them to the first Faraday rotator;

the first Faraday rotator is configured to rotate the polarization directions of the third crystal backward o light and the third crystal backward e light by an angle of $\alpha 1$ in the first rotation direction, and then output them to the first birefringent crystal;

the first birefringent crystal is configured to cause the third crystal backward o light to generate a first displacement of the third crystal backward o light, and the third crystal backward e light to generate a first displacement of the third crystal backward e light;

wherein a sum of the first displacement of the third crystal backward o light, the second displacement of the third crystal backward o light, and the third displacement of the third crystal backward o light causes the third crystal backward o light to deviate from the forward optical path, and a sum of the first displacement of the third crystal backward e light, the second displacement of the third crystal backward e light, and the third displacement of the third crystal backward e light causes the third crystal backward e light to deviate from the forward optical path, to prevent backward light from coupling into the input waveguide.

17. The optical isolator according to claim 16, wherein an xyz coordinate system is established with the forward direction of the optical path in the birefringent crystals as the z-axis direction;

the e-light oscillation plane through the optical axis of the first birefringent crystal intersects with the xy plane at the first straight line, and the angle between the first straight line and the y-axis is $\varphi 1$; the e-light oscillation plane through the optical axis of the second birefringent crystal intersects with the xy plane at the second straight line, and the angle between the second straight line and the y-axis is $\varphi 2$; the e-light oscillation plane through the optical axis of the third birefringent crystal intersects with the xy plane at the third straight line, and the angle between the third straight line and the y-axis is $\varphi 3$; wherein $0° \leq \varphi 1 \leq 360°$, $|\varphi 2-\varphi 1|=(m \cdot 90°+\alpha 1)$, $0 \leq m \leq 3$, m is an integer, $|\varphi 3-\varphi 1|=(n \cdot 90°)$, n=1 or 3.

18. The optical isolator according to claim 16, wherein, the angle between the normal of an incident surface of the forward light and the optical axis of the first birefringent crystal, the second birefringent crystal and the third birefringent crystal is the walk-off angle $\theta 1$, $\theta 2$, and $\theta 3$ respectively, wherein $0°<\theta 1<90°$ or $-90°<\theta 1<0°$, $0°<\theta 2<90°$ or $-90°<\theta 2<0°$, $0°<\theta 3<90°$ or $-90°<\theta 3<0°$, the walk-off angle is configured to control a relative walk-off between an exiting o light and an exiting e light in response to the light traveling through the corresponding birefringent crystal.

19. The optical isolator according to claim 16, wherein the polarization direction of the first crystal forward o-light aligns with the o-light polarization state or e-light polarization state of the second birefringent crystal after passing through the first Faraday rotator.

20. The optical isolator according to claim 16, wherein the polarization state of the first crystal forward o-light aligns with the o-light polarization state or e-light polarization state of the third birefringent crystal after passing through the second Faraday rotator.

* * * * *